United States Patent

Takhar et al.

[11] Patent Number: 6,002,787
[45] Date of Patent: Dec. 14, 1999

[54] FINGERPRINT ANALYZING AND ENCODING SYSTEM

[75] Inventors: Harinder S. Takhar, Bemidji; Barry M. Wendt, Maple Grove; Benedict A. Wittig, Bloomington, all of Minn.

[73] Assignee: Jasper Consulting, Inc., Bemidji, Minn.

[21] Appl. No.: 08/568,404

[22] Filed: Dec. 6, 1995

Related U.S. Application Data

[63] Continuation of application No. 08/152,974, Nov. 12, 1993, abandoned, which is a continuation-in-part of application No. 07/967,166, Oct. 27, 1992, abandoned.

[51] Int. Cl.[6] .................................................. G06K 9/00
[52] U.S. Cl. ............................................................ 382/125
[58] Field of Search ..................................... 382/124, 125, 382/126, 127; 283/68, 69; 356/71; 396/15

[56] References Cited

U.S. PATENT DOCUMENTS

| | | |
|---|---|---|
| 3,419,287 | 12/1968 | Rudie . |
| 3,872,438 | 3/1975 | Cuttill et al. . |
| 3,959,884 | 6/1976 | Jordan et al. . |
| 4,047,154 | 9/1977 | Vitols et al. . |
| 4,151,512 | 4/1979 | Riganati et al. . |
| 4,156,230 | 5/1979 | Riganati et al. . |
| 4,185,270 | 1/1980 | Fischer, II et al. . |
| 4,208,651 | 6/1980 | McMahon . |
| 4,210,899 | 7/1980 | Swonger et al. . |
| 4,225,850 | 9/1980 | Chang et al. . |
| 4,253,086 | 2/1981 | Szwarcbier . |
| 4,260,979 | 4/1981 | Smith . |
| 4,338,025 | 7/1982 | Engel . |
| 4,414,684 | 11/1983 | Blonder . |

(List continued on next page.)

FOREIGN PATENT DOCUMENTS

| | | |
|---|---|---|
| 0 159 037 | 10/1985 | European Pat. Off. . |
| 4125198C1 | 5/1992 | Germany . |
| 63-153687 | 11/1988 | Japan .................................. G06K 9/00 |
| 5089324 | 8/1993 | Japan . |
| 1 283 748 | 8/1972 | United Kingdom . |
| WO82/03286 | 9/1982 | WIPO . |
| WO 91/07728 | 5/1991 | WIPO . |
| WO93/07584 | 4/1993 | WIPO . |

OTHER PUBLICATIONS

Webster's Ninth New Collegiate Dictionary. pp. 118 and 401, 1991.

Weber. "A Cost Effective Fingerprint Verification Algorithm for Commercial Applications." Proc. of 1992 South African Symposium on Comm. & Sig. Processing, pp. 99–104, Sep. 1992.

Publications: Pattern Recognition, Oxford, GB; pp. 295–303, Masahiro Kawagoe and Akio Tojo 'Fingerprint Pattern Classification'.

1986 International Carnahan Conference on Security Technology, Aug. 1986 Gothenburg, SE; pp. 235–243, M. K. Sparrow et al. 'Topological Coordinate Systems: Applications in Latent Mark Matching and Image Retrieval'.

PCT/US93/10210 International Search Report Oct. 22, 1993.

Hopper et al. "Compression of Grey–Scale Fingerprint Images" DCC '92. Data Compression Conference, Mar. 1992, pp. 309–318.

*Primary Examiner*—Jon Chang
*Attorney, Agent, or Firm*—Merchant & Gould P.C.

[57] ABSTRACT

A system for converting an image-enhanced digitized raster fingerprint image to vector lines in order to generate a unique identification value for the fingerprint. The raster image pixels are converted to vector lines along the fingerprint ridges and the vector lines are classified and converted according to type. The line types are then analyzed and a list of identification features corresponding to the vector line types is generated. The identification features between the vector line types are compared and the image is classified according to fingerprint class. A unique identification value is then generated by numerically encoding the classified identification features.

33 Claims, 23 Drawing Sheets

U.S. PATENT DOCUMENTS

| | | |
|---|---|---|
| 4,449,189 | 5/1984 | Feix et al. . |
| 4,454,610 | 6/1984 | Sziklai . |
| 4,525,859 | 7/1985 | Bowles et al. . |
| 4,581,760 | 4/1986 | Schiller et al. . |
| 4,607,384 | 8/1986 | Brooks . |
| 4,618,988 | 10/1986 | Schiller . |
| 4,636,622 | 1/1987 | Clark . |
| 4,641,350 | 2/1987 | Bunn . |
| 4,646,352 | 2/1987 | Asai et al. . |
| 4,685,145 | 8/1987 | Schiller . |
| 4,696,046 | 9/1987 | Schiller . |
| 4,698,751 | 10/1987 | Parvin . |
| 4,723,298 | 2/1988 | Schiller . |
| 4,747,147 | 5/1988 | Sparrow . |
| 4,752,966 | 6/1988 | Schiller . |
| 4,777,651 | 10/1988 | McCann et al. . |
| 4,787,742 | 11/1988 | Schiller et al. . |
| 4,790,564 | 12/1988 | Larcher et al. . |
| 4,805,223 | 2/1989 | Denyer . |
| 4,811,414 | 3/1989 | Fishbine et al. . |
| 4,817,183 | 3/1989 | Sparrow . |
| 4,827,527 | 5/1989 | Morita et al. . |
| 4,837,843 | 6/1989 | Owechko . |
| 4,876,726 | 10/1989 | Capello et al. . |
| 4,891,503 | 1/1990 | Jewell . |
| 4,896,363 | 1/1990 | Taylor et al. . |
| 4,933,976 | 6/1990 | Fishbine et al. . |
| 4,944,021 | 7/1990 | Hoshino et al. . |
| 4,947,442 | 8/1990 | Tanaka et al. . |
| 4,947,443 | 8/1990 | Costello . |
| 4,956,870 | 9/1990 | Hara . |
| 4,993,068 | 2/1991 | Piosenka et al. . |
| 4,995,086 | 2/1991 | Lilley et al. . |
| 5,040,223 | 8/1991 | Kamiya et al. . |
| 5,040,224 | 8/1991 | Hara . |
| 5,050,220 | 9/1991 | Marsh et al. . |
| 5,050,222 | 9/1991 | Lee . |
| 5,053,608 | 10/1991 | Senanayake . |
| 5,054,090 | 10/1991 | Knight et al. . |
| 5,067,162 | 11/1991 | Driscoll, Jr. et al. . |
| 5,095,194 | 3/1992 | Barbanell . |
| 5,101,436 | 3/1992 | DeAguiar et al. . |
| 5,105,467 | 4/1992 | Kim et al. . |
| 5,109,428 | 4/1992 | Igaki et al. . |
| 5,144,680 | 9/1992 | Kobayashi et al. . |
| 5,175,593 | 12/1992 | Kumagai et al. . |
| 5,187,747 | 2/1993 | Capello et al. . |
| 5,222,152 | 6/1993 | Fishbine et al. . |
| 5,222,153 | 6/1993 | Beiswenger . |
| 5,239,590 | 8/1993 | Yamamoto . |
| 5,337,369 | 8/1994 | Shibuya ................................. 382/125 |

Fig. 3b

INSTRUCTIONS:

TO OBTAIN CLASSIFIABLE FINGERPRINTS:

1. USE INK PAD PROVIDED.
2. PLACE THE CARD AND THE PAD ON A HARD SURFACE LIKE THE KITCHEN COUNTER OR A TABLE.
3. WASH AND DRY FINGERS THOROUGHLY OR USE THE MOIST NAPKIN PROVIDED.
4. ROLL FINGERS NAIL TO NAIL AND AVOID ALLOWING FINGERS TO SLIP BY HOLDING THE FINGER DOWN WITH THE OTHER HAND WHILE YOU ROLL IT.
5. BE SURE THE IMPRESSIONS ARE RECORDED IN THE CORRECT ORDER.
6. IF AN AMPUTATION OR OTHER SUCH DEFORMITY DOES NOT ALLOW PERFECT IMPRESSIONS MAKE A NOTATION TO THAT EFFECT IN THE APPROPRIATE BOX.
7. EXAMINE THE COMPLETED PRINTS TO SEE IF THEY CAN BE CLASSIFIED, IF NOT CALL FOR A NEW CARD.
8. DO NOT PUT ANY OTHER MARKS ON THIS CARD.
   IF CARD IS NOT CLEAN OR DAMAGED CALL FOR NEW CARD.

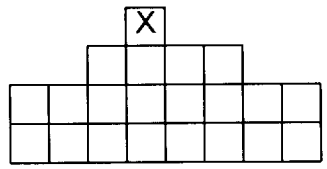
Fig. 23
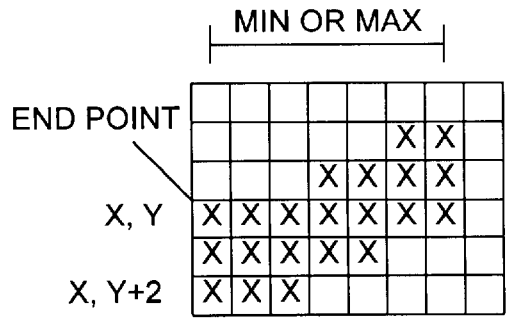
Fig. 26
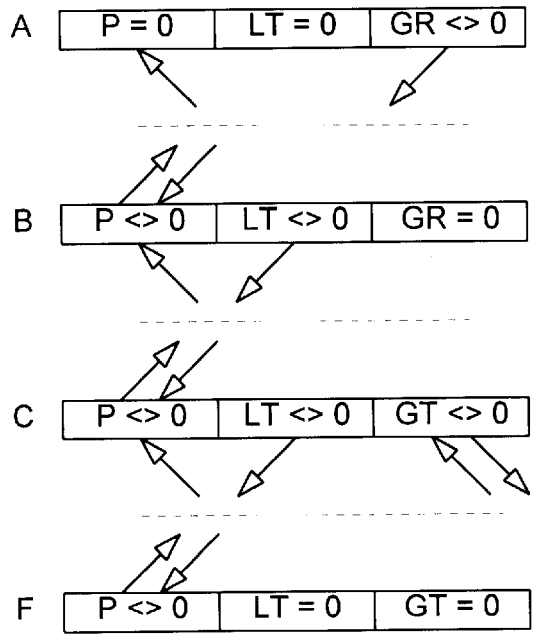
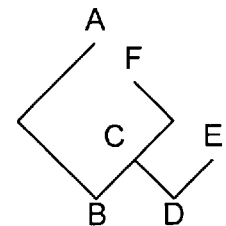
Fig. 24
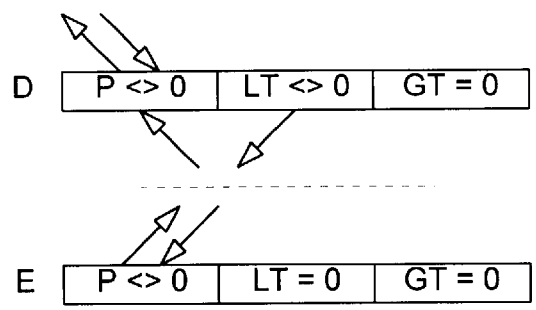
Fig. 25

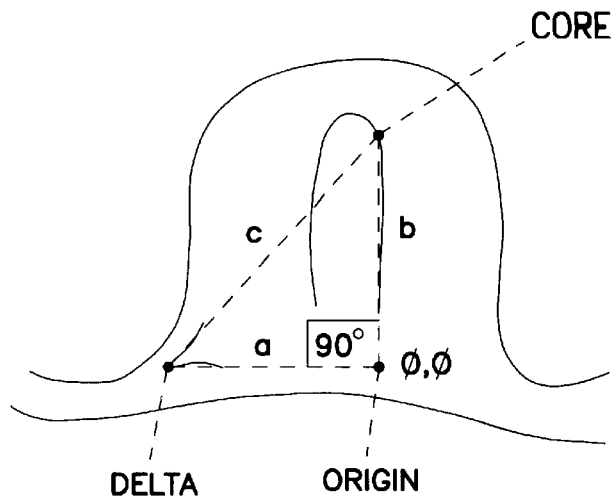
FIG. 32
FIG. 33
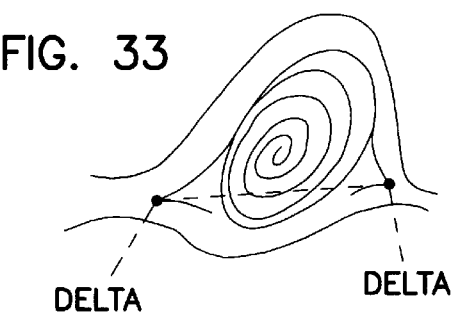
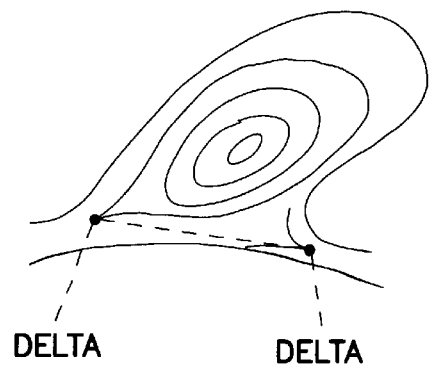
FIG. 34

FINGERPRINT ANALYZING AND ENCODING SYSTEM

CROSS REFERENCE TO PARENT APPLICATION

This is a CONTINUATION of application Ser. No. 08/152,974, filed Nov. 12, 1993 now abandoned, which is a continuation-in-part of U.S. patent application Ser. No. 07/967,166, which was filed Oct. 27, 1992, now abandoned and which is herein fully incorporated by reference.

FIELD OF THE INVENTION

The present invention pertains generally to a fingerprint comparison system, and more particularly to a method and apparatus for analyzing and encoding a fingerprint image in order to generate a unique identification value for the fingerprint.

BACKGROUND OF THE INVENTION

According to one conventional fingerprint verification method for a security system, an image including the protuberant lines of a fingerprint is binarized and thinned so as to calculate a protuberant line pattern. Then branch points, end points and curvature are extracted from the protuberant line pattern as the main characteristics of the fingerprint. Based on those characteristics, a comparison is performed between a master image (image of a reference fingerprint) and a sample image (image of a fingerprint to be examined). Since in this prior art approach characteristics of interest appear over a relatively large portion of the entire fingerprint, it has been preferable in this conventional fingerprint verification method to evaluate a fingerprint image covering a wide area. Therefore, such images of fingerprints have been taken by rotating the finger, this including in the image not only the front part of the finger but also the sides of the finger.

The protuberant lines at the lower portion of the fingerprint, i.e., a joint part of a finger, are usually arranged in a horizontal direction; therefore, there are few characteristics. Furthermore, the image at the lower portion of the fingerprint is usually input incorrectly; therefore, it is ineffective data for fingerprint verification. Accordingly, when using such an image for fingerprint verification, accurate verification will be difficult to perform due to the vast volume of noise in the data. Also, when using raterized data representing the fingerprint, the volume of input data becomes so large that it becomes necessary to expand memory capacity, and comparison operations are complex and typically take a large amount of time to perform. The present invention vastly simplies these problems by implementing a vector analysis technique compatible with a much smaller image area of the fingerprint.

SUMMARY OF THE INVENTION

The present invention provides a system for converting an image-enhanced digitized raster fingerprint image to vector lines in order to generate a unique identification value for the fingerprint. The raster image pixels are converted to vector lines along the fingerprint ridges and the vector lines are classified and converted according to type. The line types are then analyzed and a list of identification features corresponding to the vector line types is generated. The identification features between the vector line types are compared and the image is classified according to fingerprint class. A unique identification value is then generated by numerically encoding the classified identification features.

BRIEF DESCRIPTION OF THE DRAWINGS

FIG. 23 is a false end point detected by the present invention.

FIG. 24 is a complex vector compatible with the present invention.

FIG. 25 is an ordered tree compatible with the present invention.

FIG. 26 is a portion of a raster image of a typical line segment compatible with the present invention.

FIG. 32 shows resulting delta, core, and origin points determined with the present invention.

FIG. 33 shows the determination of delta points of a plain whorl pattern compatible with the present invention.

FIG. 34 shows the determination of delta points of a central pocket whorl pattern compatible with the present invention.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

As previously described, the present invention relates to a system for converting an image-enhanced digitized raster fingerprint image to vector lines in order to generate a unique identification value for the fingerprint. As the present application is a continuation-in-part of copending U.S. patent application Ser. No. 07/967,166, filed Oct. 27, 1992, now abandoned, which is herein fully incorporated by reference, immediately below is the specification portion of the parent application which describes a preferred credit card fraud prevention system. The parent specification and corresponding figures are retained in this application in order to provide context for the reader, and also to illustrate an application which may be used with the present fingerprint analyzing and encoding invention. It will be recognized that the present invention may be used in numerous other applications without loss of generality. The present invention is described below in the application following the discussion of the preferred credit card fraud elimination system.

Credit Card Fraud Elimination System

The preferred embodiment of the present credit card fraud elimination system is intended to be integrated into existing credit card company data bases with the addition of a master data base to process and screen all existing customers. Once the preferred embodiment is implemented, the master data base from then on will only be used to screen new applicants and authorizations for credit. One of ordinary skill in the art will recognized that the present invention is not limited to credit card systems but may be implemented with other types of financial systems, controlled access systems, secure access systems, or other systems requiring the identification of individuals.

Obtaining Fingerprints

Figure 3:
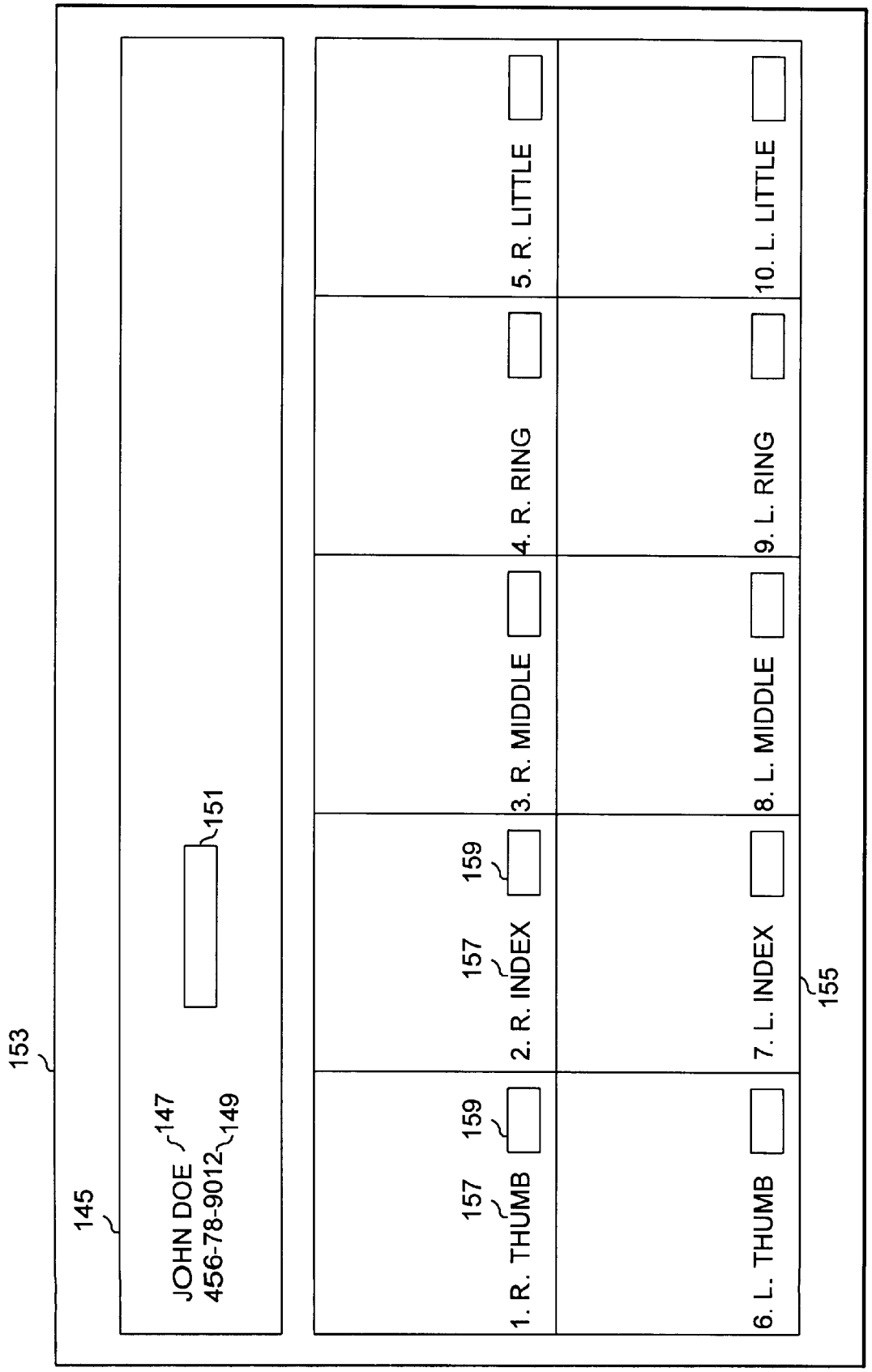
FIGS. 3A and 3B are a fingerprint form and instructions compatible with the present invention.

The task of obtaining fingerprints of millions of credit card users is made easier by integrating it into the existing billing and account statement cycle that are currently being used by credit card companies and financial institutions. The credit card companies and financial institutions have computers which contain the name, address, account number, and other personal information on every one of their customers billing or statement cycles. The computers every month automatically generate all the relevant information at the right times for all the right people. To obtain the fingerprints of a credit card user a special fingerprint form as shown in FIG. 3a preferably is sent out with their monthly statement. In addition, a small ink pad and moist napkin may also be provided. The fingerprint form 153 has a first information area 145 that contains, for example, the account user's name 147 and social security number 149. The first information area 145 also contains a machine readable information area 151 which contains personal information about the credit card user which may or may not be printed in the first information area 145. The machine readable format 151 may be bar code, magnetic strip, or punched holes within the card, and one with ordinary skill in the art will recognize that other machine readable implementations may be used without loss of generality. The fingerprint form 153 contains a second information area 155 which is subdivided within the area with up to ten equal spaces which correspond to areas for fingerprints of all ten fingers. Each space may be labeled with a label 157 and may also contain a machine readable code 159 which identifies which finger this fingerprint area corresponds to. The instructions for filling out the form may be printed on the back of the form substantially as shown as FIG. 3b. The space allocated for each finger may be preprinted with a machine readable code indicating which finger it is. Depending on system implementation, this eliminates human error when entering the fingerprints into the system. When the card is fed into the computer it preferably is automatically associated with the correct account file with whom the prints belong to and which prints belong to which finger. This form can be incorporated directly into the existing billing form. For instance, it may be incorporated on the bottom third portion of the form so that the customer can tear it off and mail it back with an enclosed envelope, which may also be preprinted with a machine readable code, thus allowing the return of the envelopes containing the fingerprint cards to be separated from the rest of the incoming mail.

The entire process of collecting and rostering all of the fingerprints will take anywhere from three to six months during the normal billing cycle used by the financial institution. When the fingerprint forms are mailed out with a billing cycle, there may also be included a polite letter explaining what is required of the user and suggesting that the user mail the forms back with the payment of their bill or sooner in the enclosed envelope.

The ink pad used to get the fingerprints clear and unsmudged may be especially designed for this application and is similar to the ink pads which are used widely by various law enforcement authorities. These ink pads have special black ink which is well known within the industry, which does not smudge and which leaves a very clear fingerprint if the user places the fingerprint form on a hard surface. Both the hard surface and the ink quality help insure a completely clean unsmudged print.

Since there is typically only a one time use of each ink pad, they may be especially designed to accomplish just that. In a first embodiment, the ink pads are in a form of a small patch of ink over a sufficient area on the fingerprint card. This area containing a blotch of ink is covered with a protective coating which the user peels off, exposing a patch of ink which could be used during the fingerprinting process. In a second embodiment, the ink pad is a small plate (stiff paper) which is sufficiently moist with the required ink. This plate is sealed with an appropriate covering, attached to the fingerprint form, or simply enclosed in the envelope. The customer tears or peels open the sealed package in order to expose the ink surface, uses it, and then discards the packing and the plate. Instructions may be placed on the reverse side of the fingerprint form in order to advise the customer to place the pad and the form on a hard surface such as a kitchen counter, table, or a desk and to follow the simple directions and then mail back the form in the enclosed envelope.

The moist napkin that typically is included with the fingerprint form and ink pad is similar to the ones used in various restaurants and is readily available from a variety of vendors.

The process of entering all fingerprint data into the system is fast and accurate; the alpha numeric information can either be previously stored in the computer database and linked with the fingerprint images by machine reference to the encoded information on the form, or from the individual customer account information and the fingerprints themselves, which may be simultaneously read by a machine from the same card at the same time.

Rostering Users

Figure 12:
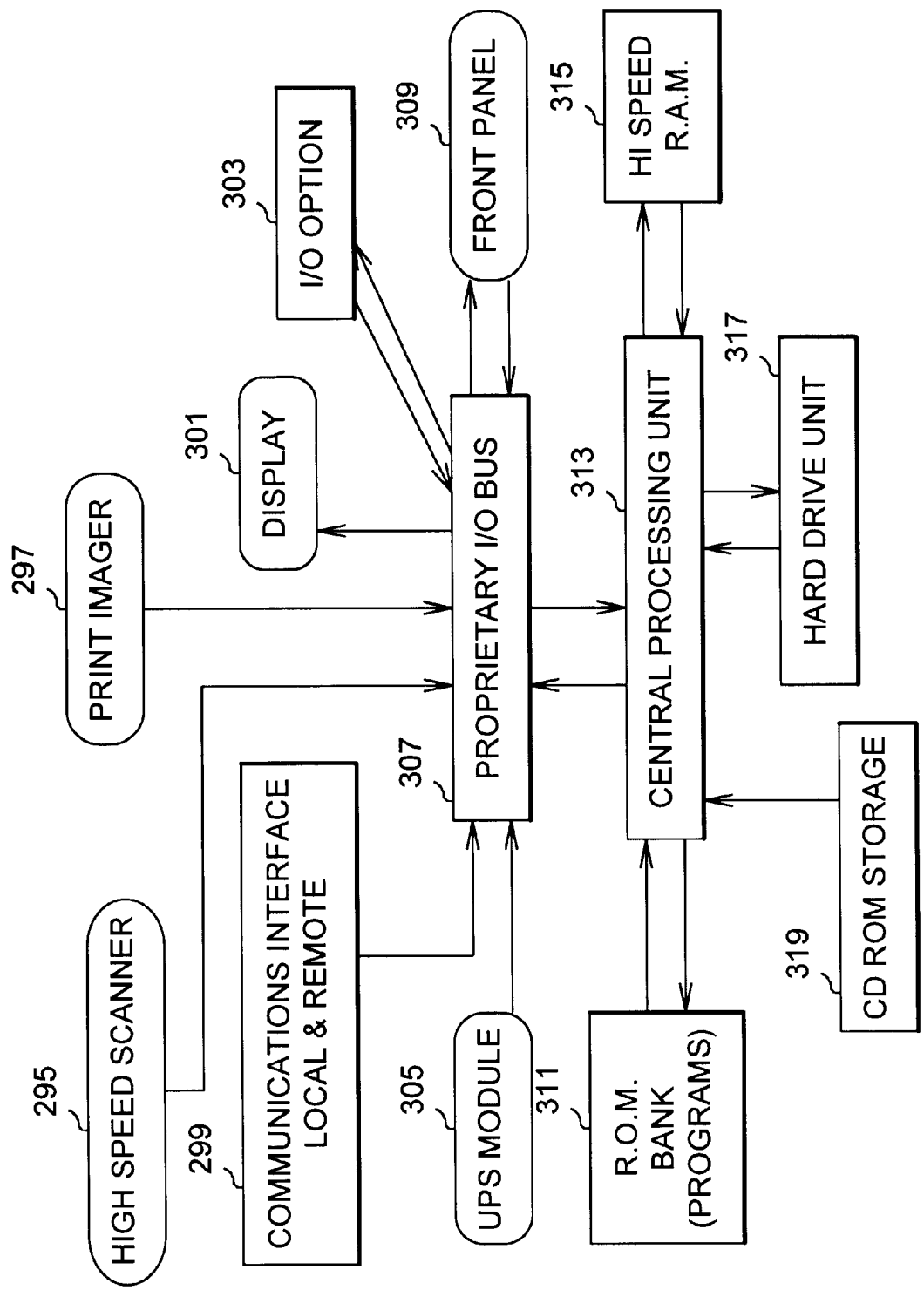
FIG. 12 is a block diagram of the schematic of a rostering apparatus compatible with the present invention.

A preferred apparatus for automatically rostering users on the system is shown in FIG. 12. A processor 313 with read only memory (ROM) 311 and high-speed random access memory (RAM) 315 connect to a data input/output (I/O) bus 307 powered by an uninterruptable power supply 305 (UPS). The processor 313 processes data going to and coming from a front panel 309, a display 301 and optional I/O devices 303. A fingerprint image scanner 297 reads an operator's fingerprint, while a communication module 299, typically comprising a modem, sends and receives information to and from remote devices via standard telephone lines, or other such communication lines. A high speed form scanner 295 reads account information and scans and electronically encodes fingerprints from a fingerprint form. The read and scanned information may be stored on mass hard disk storage 317 and compared to compact disk read only memory (CD ROM) storage 319.

The rostering apparatus typically serves as the single source of fingerprint data entry for inclusion in a client database, which is preferably used in association with verification of a customer identification at a merchant site. The rostering apparatus is preferably located in a temperature and humidity controlled environment, suitable for high speed document imaging. Data flow starts with the high speed scanner 297 serving as the input device for the customer completed fingerprint forms. Print images are scanned, digitized, and routed to the processor 313 via the data I/O bus 307. Control and data signals are clocked to the front panel 309 for operator instructions, under control of programs initially stored in ROM 311. The programs are then transferred to high speed RAM 315, whereby the processor 313 calls, transfers and manipulates all system activity. For all normal scanning functions there is no mass storage activity, which slows down the system. The use of preferably 20 nanosecond or faster RAM 315 insures minimal processor 313 wait state cycles. The data I/O bus 307 incorporates large scale caching techniques, and features a standalone, dedicated processor that serves to direct data, preferably providing the processor 313 with data at all times. The ROM 311 based programs provide the necessary protocol conversions and interfacing instructions that route and convert print data to the communication module 299, which is co-processed. This communications module 299 preferably supports direct IBM attachment, 5150, 3270 emulations, and/or Novell and UNIX connectivity.

Fingerprint Imaging Scanner

The fingerprint imaging scanner 297 runs in parallel to high speed form scanner 295 to verify the identity of system operator personnel. The CD ROM storage unit 319 is preferably used for storing locally operator fingerprints downloaded from the main database, as well as other database information as needed. The hard disk storage 317 serves as a storage device for diagnostic and system utility programs, as well as for configuration backup files. The hard disk storage 317 is also used for storing temporary system files and serving as a buffer for communications interruptions that may occur with remote devices.

The UPS 305 is a bus preferably attached to a DC power supply that is integrated into all systems to allow for a controlled power down sequence preferably preserving all data and securing the communications link with remote devices if a power interruption occurs.

The I/O option 303 preferably is a direct bus access reserved for future enhancements such as multiple scanners, imagers, or communication ports. The display 301 accommodates multiple monitors or LCD displays. The power supply is preferably a 300 watt, 110/220 v switchable UL, CSA, TUV, FCC Approved unit. One skilled in the art will recognize that other equivalent hardware may be substituted for the above without loss of generality.

Rostering Process

Figure 1:
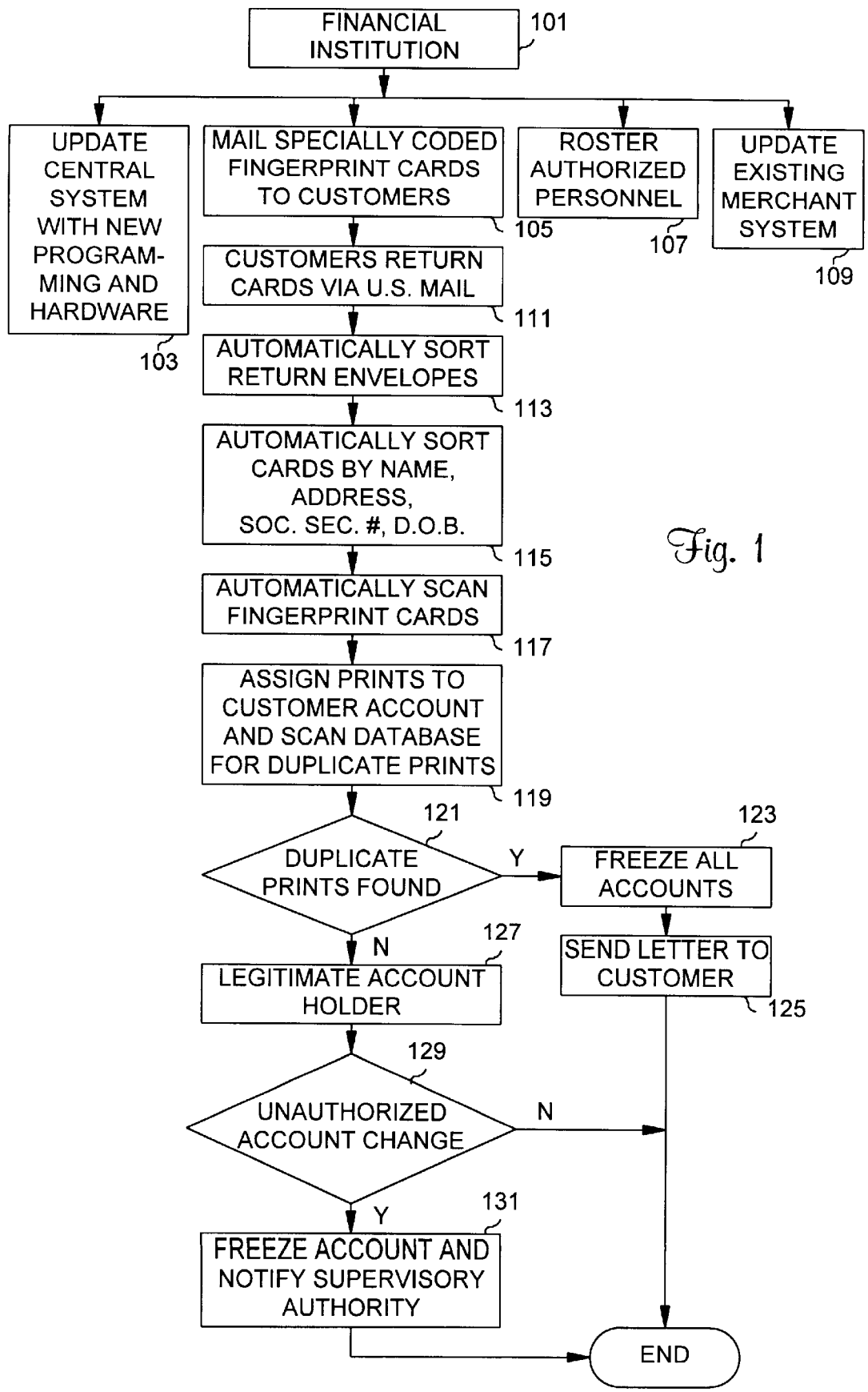
FIG. 1 is a block diagram showing a credit card fraud elimination system compatible with the present invention.

A typical process for automatically rostering users on the system is shown in FIG. 1. A financial institution 101 updates their central computer system with new software and new hardware 103, adds authorized personnel 107 and also updates the existing merchant machinery 109. The financial institution 101 mails specially encoded fingerprint forms to customers 105. Customers place their fingerprints on the forms and return them to the financial institution 101 via U.S. mail at 111. Because of the coded information on the forms, when the forms are received back at the institutions mail room, they first go through the mail sorting room equipment. Then all of the envelopes which were sent to the customers to mail the forms in will be separated at 113, since those envelopes also have on them a special machine readable code which allows them to be separated from the rest of the mail. Once the envelopes are open, the forms are fed into the scanning units, which automatically sort the forms by name, address, social security, and date of birth at 115, and the fingerprint portion of the forms are automatically scanned at 117. Once the user account information and encoded fingerprints have been read into or linked within the system, the fingerprints are assigned to the customer account at 119, and the computer data base of all previously stored fingerprints is scanned for duplicate prints at 119. If at 121 duplicate prints are found, all accounts associated with this set of fingerprints are frozen at 123, including the newly-opened user account, and a letter is sent to all of the customers at 125, informing them that there is problem with identification which must be resolved before their accounts may be used. Otherwise, if at 121 duplicate prints were not found, the determination is made at 127 that the account holder is legitimate, and the account is marked as complete. If at 129 subsequent to the establishing of a legitimate account an unauthorized account change takes place, the account is frozen at 131, and a supervisory authority is notified.

Fraud Prevention System (FPS)

The preferred fraud prevention system (FPS) stores, scans, matches or mismatches any fingerprint image that is received by the system for purposes of authorization on a charge or for issuance of a new credit card. The preferred system design provides for the alerting of proper authorized personnel in case of a fingerprint mismatch, which eliminates and prevents the issue of a fraudulent card or any unauthorized manipulation of an existing account. In case of a new credit card or any alteration to an existing file, the credit card company employee initiating the request preferably is also included in the screening process, and no information is given or altered, and no information for a new file is saved or activated, until the employee initiating the request is also screened and verified as an authorized person. It is preferable that there is no override to this process by the employee without appropriate intervention by superiors.

Preferred database files comprise a G database file (meaning "good") and an F database file (meaning "fraudulent"). These files are used for storing and integrating all of the fingerprints obtained from all of the customers such that one or the other or both are accessed automatically any time a customer file is accessed for purposes of authorization or when a new file is being created for a new account. The G file contains scanned fingerprint imaging data of all the clients who have been issued a legitimate credit card, and typically is accessed first when authorizing a transaction or issuing a new credit card.

Figure 2:
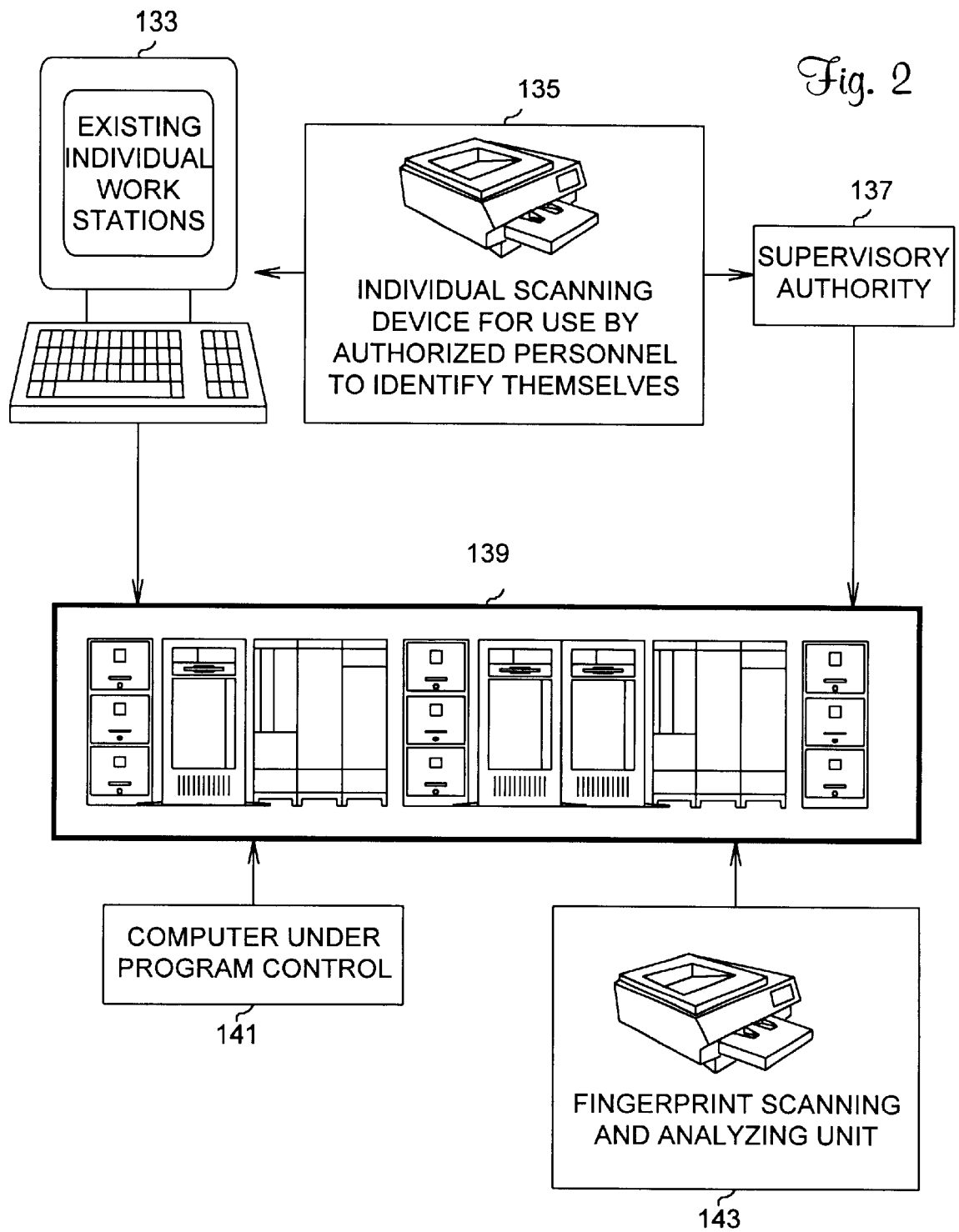
FIG. 2 is a block diagram showing a method for adding a user record to a computer database compatible with the present invention.

In the case of an application for a new credit card, as soon as all of the basic information has been entered into computer system 139 and the potential customer has been approved for a credit, but before authorization to actually print and issue the credit card has been granted, the computer software 141 preferably prompts the authorizing employee setting up the user account to scan in (input) the finger prints which have been received from the potential customer at 143 along with the fingerprint of the employee at 135 in FIG. 2. Alternatively, the fingerprint screening may be done before the rest of the approval process is performed. The prints that come from the customer and the prints from the employee typically are immediately logged on to both the G and the F files on a temporary basis, as the potential customer has not yet been screened.

Once scanned, it is preferable that neither one of these prints may be manipulated or deleted from the memory of either the FPS or the preferred absolute identification device (AID) files, the latter of which will now be discussed. In the preferred AID, both G and F files are activated to first scan the fingerprints of the file creating employee to verify if that person is a person who is authorized to create such a file. If the prints do not match with those on record for an employee who is an authorized person to be using that work-station, the entire user file that was just created preferably is deleted from the system, except that the fingerprints of the creating person typically are identified with whatever employee name was used, and such information is permanently stored in the F file as a person who attempted fraud. If their fingerprints match any fingerprints on record, the system typically then records, searches and identifies the prints of the person for whom this file is being created. At this time all system files may be searched to see if there is a match with any other person of a different name or address. If they do match after a second attempt, the user file preferably is completely erased from the system, with the exception that the fingerprints of the user record may be automatically entered into the F file. In the preferred system, the employee will not be able to close the user file and mark it as complete, even if the power to the work station 133 being used is disconnected, as the transaction has already been recorded with the G and F files. As soon as the work station 133 is turned on again, it normally returns to where it left off when power was interrupted. At the same time a second mismatch occurs, an authorized superior 137 to the employee initiating the request processing this application, is preferably automatically alerted that a fraudulent application is being attempted.

Preferably, if the user fingerprint are illegible or unclear, a supervisor 137 is notified and both the initiating employee and the supervisor employee 137 must verify by using their fingerprints that they have viewed these user fingerprints and they are legible and clear. This ensures that more than one person is aware of the problem and that all the right steps are being followed so that a legitimate person is not accidentally classified as fraudulent.

If the user fingerprints are determined to be illegible, the user file may be erased from the system, and the applicant may be automatically sent a form letter along with a new fingerprint form suggesting that the person should apply again with more legible fingerprints.

Figure 6:
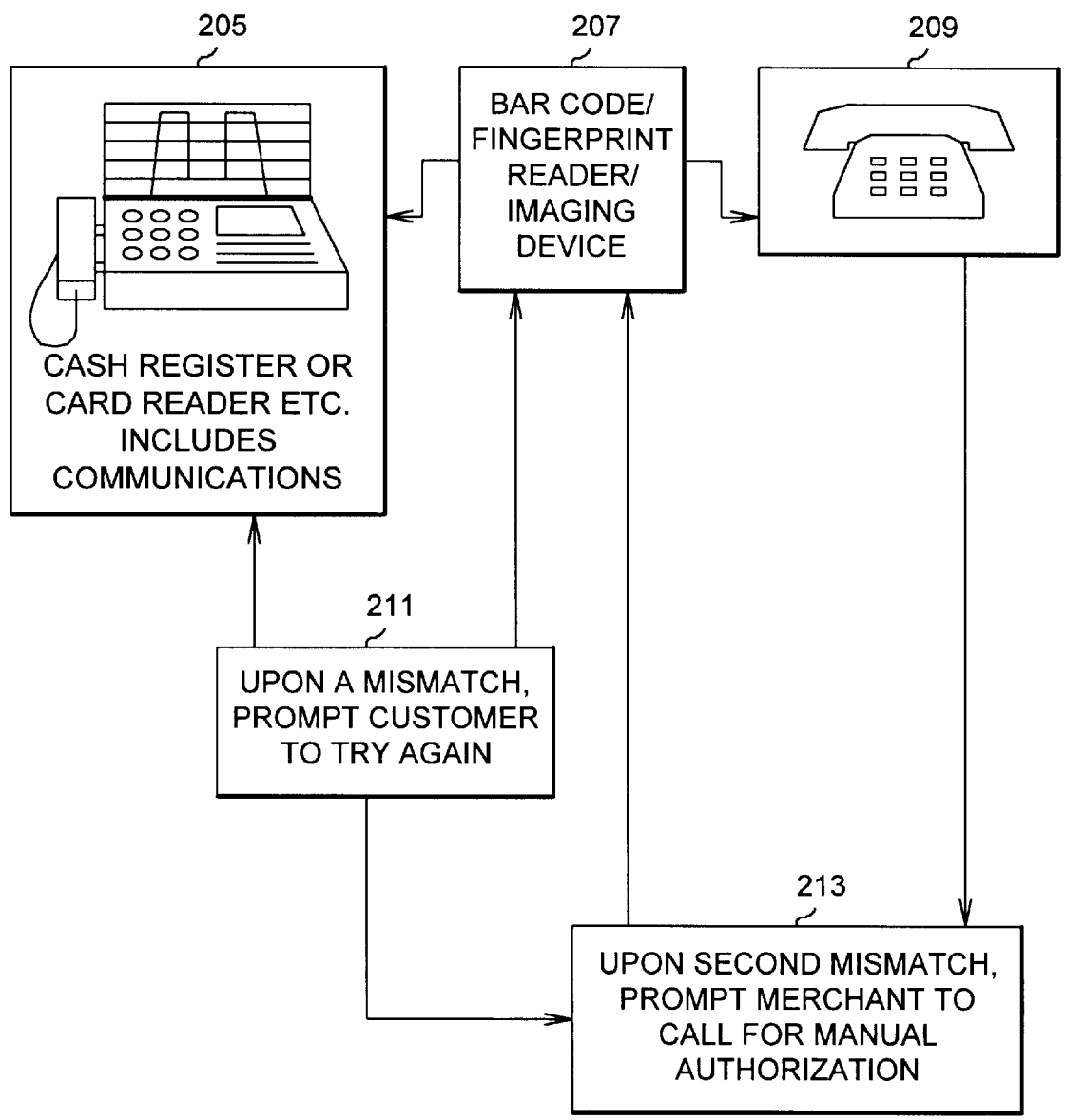
FIG. 6 is a block diagram showing a system to prevent a legitimate user from being mis-identified compatible with the present invention.

When a user file is accessed for purposes of authorization, normally the only fingerprint information being matched is that of the legitimate owner of that account stored in the form of numerical encoding associated with the user file. The preferred authorization process, shown in FIG. 6, is attempted at least twice at 211 and 213 in case of a fingerprint mismatch in order to ensure accuracy and exactness of the prints. Upon a second mismatch 213, the system disconnects and the approval of credit is denied. The merchant then calls an employee at 209 to go through the verification process manually.

Present credit cards have a magnetic strip on the back which encodes information about the account name, account number, financial institution's name and/or code, institution's federal clearing code/routing code, and other such accounting information, but nothing else about the card holder.

The preferred system provides for credit cards with additional information about the account holder and card holder (as these may be two different people or organizations) and processes the information as described below. The additional personal information relates to the name of the account holder, name of the card holder (if different), address, social security number, date of birth, and gender of the card holder. When a credit card with the additional personal information is run through a card reader unit at a merchant site, 205 of FIG. 6, the information is transferred to the client file which the merchant is accessing. First, the information is matched with that on the file, and then the fingerprint information is matched with that on this same account file. A mismatch of all five information elements and fingerprint information is highly unlikely. If however, the fingerprint information and another element of personal information do not match and the proper procedure has been followed, then it is possible that a legitimate customer is attempting a transaction and something may be wrong. At this time an operator or employee from the financial institution clearing facility may be called to assist with the transaction, just as is done under present systems. After the second attempt to match information, the merchant is prompted to call the clearing employee and the verification proceeds manually.

In the preferred system, the majority of fingerprints and corresponding account and personal information is contained in the G file, as most users will be legitimate users. However the F file is active and runs in parallel to the G file when existing client files are accessed or when a new user account is created. When any information on fingerprints is discarded from the G file, the system automatically accesses the F file and makes a record of the event and starts a search process of matching, identifying the user, and recording the final result. Normally, the G file is used during the initial processing of the application, or when an employee creating the new account is not an authorized person, or when there is a mismatch for incoming fingerprints from a merchant site, and the F file is only accessed when there is a problem.

The preferred F file acts as an archive to contain the fingerprints of all the users who in the past have committed or have attempted any fraud. The F file is also responsible for storing all the fingerprints and any corresponding relevant data of users who in the future might be committing credit card fraud.

Upon initial installation of the preferred embodiment at a merchant site, the merchant will typically enter a telephone phone number for the local law enforcement agency. Initial installation is not completed without this information or a manual override by the merchant, and the merchant equipment is inoperative until this step has been completed. Manual override may optionally be eliminated by a financial institution. As soon as this step is done and the merchant has completed other normal setup functions, merchant verification is done using the preferred AID system to verify the identity of the merchant. Only after this process has been completed is the merchant system operative.

The preferred initialization process described above may be customized for individual merchant needs by allowing the identification of each employee as well as when the equipment may be used and by whom. The merchant unit may optionally contain a mini-version of the data processing part of the preferred FPS containing fingerprints identifying each one of the employees. The system then screens employees and maintains a record of employee activities. In case of unauthorized activity by any employee, the system alerts any first available authorized superior employee who then deals with the situation appropriately. This also protects financial institutions, in that, in case an unscrupulous employee is somehow processing fraudulent charges as telephone orders or mail orders, there is a record of the employee who did it. This also eliminates a situation where a fraudulent employee attempts to use another employee's system.

Verification Process

Under present systems when a customer wants to charge a purchase at a merchant location, the customer presents a credit card which has information on it in the form of a magnetic strip and sometimes in the form of a human-readable account number and name on the other side. The merchant enters the account number manually or slides the card through a magnetic strip reader. This card information is then instantly relayed over present communications systems via a modem unit to a main computer database. Next, the merchant equipment has a code number (merchant number) which is either manually entered or is preprogrammed into the unit. This allows the merchant to access the main clearing computer, which then opens the customer's file containing all relevant credit information for the customer.

If the card has been reported lost or stolen at this point, the merchant would receive instructions on what to do, usually involving calling a telephone number. The merchant may be required to see some form of identification, which could be a driver's license or more credit cards. However, the identification provided by the customer may be falsified along with other credit cards, and there still is no absolute proof that the person who has made the purchase was the person authorized for such use. By the time a fraud is discovered, the purchase has already taken place, and the person responsible for the fraud has left the premises.

With the preferred AID system, a customer is required to use a fingerprint (instead of or in addition to a conventional signature) on a miniature imaging device, which may be attached or incorporated with the merchant equipment being used with existing systems. Therefore, assuming the customer has available credit, the customer is required to provide a fingerprint instead of or in addition to a signature as a means of identification.

Figure 4:
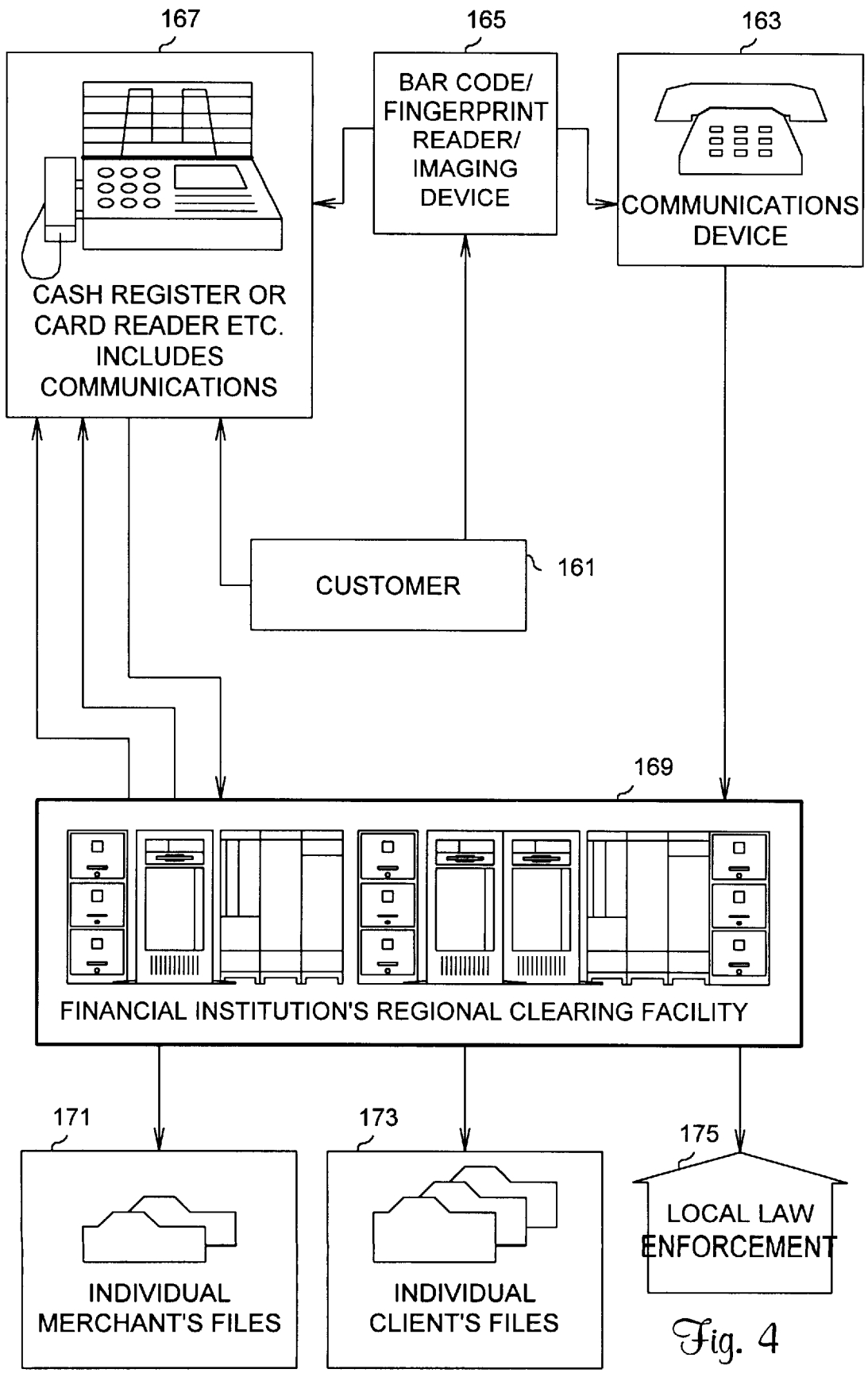
FIG. 4 is a block diagram showing a user identification system compatible with the present invention.

As shown in the preferred embodiment of FIG. 4, a fingerprint is the customer's 161 legal acceptance of the charge and the authorization for the financial institution to pay the merchant. The credit card account information is obtained on a card reader 167, and fingerprints are obtained on an imaging device as shown at 165, which converts a fingerprint image into a sequence of digitalized numerical codes, then transmits this data, through the existing communication device and network 163 to the main computer 169 and stores the data in the database files 171 and 173. Within the main database, the client file 173 is opened, and the fingerprint information obtained at the merchant site is received at the main database and compared to the set of fingerprints stored with the client file.

If the imaged fingerprint is clear and legible, the imaging device preferably issues an audible signal and converts the fingerprint into numerical codes. If the imaging device does not recognize a fingerprint image because the fingerprint is smudged or unclear, the customer typically cleans his or her fingers with a provided moist napkin, the merchant cleans the imaging surface, and the customer then repeats the fingerprint imaging process.

Upon a mismatch the second time, or when an operator has been notified, the preferred system without any further commands or action closes the client file without saving anything that may have been altered, but retains the fact that the user file was accessed. If the merchant follows the directions which were given after the first attempt and attempts to obtain authorization again, the system repeats the verification process, and if the fingerprint image matches, the authorization is given as normal, and the previously stored information about the mismatch is erased. The retry attempt preferably comes within a reasonable time frame, typically within 30 minutes, from the first attempt and is initiated from the same merchant location. In no other instance will the preferred system permit the retry attempt.

If there is still a mismatch of fingerprints and the retry attempt is within the preferred time frame at the same merchant site, the employee at the institution talks to the merchant and the customer to establish what is wrong and ensures that the fingerprinting process is being followed properly. If the identification process still comes up with a mismatch, the authorization is dealt with by the employee manually, but law enforcement officials are not normally notified. The system preferably retains records of the incident along with all relevant information about it.

The Note Pad

If the same incident with the same customer at the same merchant location or any other merchant location happens again, law enforcement officials preferably are notified automatically and immediately at 175, FIG. 4. The speed and accuracy of this notification is possible because the preferred FPS file contains a temporary, time controlled "note pad" file which is individual for every regional clearing facility. This preferred note pad file contains records of all mis-matched fingerprints for any given predetermined continuous period of time, after which the information for the preceding predetermined period of time is erased, thus allowing the note pad to carry a perpetual record of continuing mismatches for any predetermined period of time. For example, a financial institution may wish to keep track of mismatches for a period of typically 15 days at a time. Authorized personnel set the note pad to erase note pad entries 15 days after they have been logged. After the fifteenth day, the first of the days may be dropped off, providing a perpetual fifteen day cycle. The cycle can be changed at any given time and for any given geographic area. The default note pad cycle is typically seven days, with a minimum value of one day.

The note pad is active and runs concurrently with the G file and F file. The purpose of the note pad file is to provide a log of mismatched fingerprints for a given number of days in a given geographic area. During the first attempt at a given merchant site, if there is mismatch on an account and there is a record of a similar incident with the same fingerprint in the note pad, the preferred note pad inhibits any further action and instructs the main system to close the account file, notify local law enforcement officials, and deny authorization. The note pad does not add significantly to the time required to process a transaction because there are typically not many mismatched prints to compare at any one time. If there is a high number of mismatched prints in a geographic area, the financial institution can control the size of the note pad by changing the number of days the note pad tracks.

If after checking the note pad it is found there is no record of any fraudulent activity, the system continues to process the transaction normally.

Information which is being erased out of the note pad after the predetermined period of time is used to update the F file. This note pad information supersedes any previously recorded information. A financial institution may optionally set the note pad to automatically back up all information that is being erased.

Off-line Batch Processing

Due to communication delays or the remoteness of the verifying site from the financial institution, a direct real-time link to a financial institution's computers may not be desirable or feasible. In these cases, verification of the identity of the credit card customer is performed by remote off-line batch processing centers.

In order to perform off-line batch processing, a cryptology methodology is used to encrypt data associated with a credit card customer. The final data encryption consists of one or more of the following information segments according to system requirements:

1) Card holder's gender (Male or Female).
2) Social Security number.
3) Date of birth (DOB).
4) Issuing location number (Member Bank).
5) Date of card issuance.
6) Card holder personal ID number (one or more).

It will be recognized that the selection of information used to generate an exclusive account number is flexible except for the use of a card holder's personal ID numbers. The personal ID numbers are generated from actual scans of the card holder's fingerprints. The scan and subsequent processing produces typically a 16-bit binary key which classifies the unique characteristics of the fingerprint.

Preferably, all card holder fingerprints are initially scanned and reviewed in order to select the most unique print, one from each hand. The two prints are then used as the acceptable personal ID numbers which are encrypted and are used as an access code to test for an account match.

In general, the card issuing company issues a master account number which is unique, and any additional information associated with the customer is then encrypted with the personal ID numbers to generate an access code number which is used as a verification key. For example:

| | | |
|---|---|---|
| Account No. | = | 1234-5678-9012-3456 |
| Personal ID No. 1 | = | 1004008 (left hand index) |
| Personal ID No, 2 | = | 2100104 (right hand index) |

It will be recognized that the customer has a personal ID number for each finger that the card issuing institution elects to use for an access code. In an off-line batch processing mode, the system sends the account number stored on the credit card and the encoded personal ID number from the fingerprint scan from the remote merchant site to the remote batch processing system. The remote batch processing system looks up the account number and executes a de-encryption routine against each of the access code numbers stored by the batch processing center using the transmitted personal ID number as the key. The de-encrypted result must equal the expected value of one of the stored access codes in order to authorize a transaction. All de-encryptions are encoded to yield a zero result if the correct personal ID number and scan is received.

In an alternative procedure, a transaction may be authorized in an off-line mode if necessary by including the financial institution's access codes on the credit card and performing the de-encryption, comparison, and authorization steps at the merchant site.

The encryption algorithm preferably adheres to the well-known Data Encryption Standard (DES) and provides for secure communication (COMSEC). However, it will be noted that other suitable public or proprietary data encryption schemes may be substituted for the DES without loss of generality. In practice, the actual encryption/de-encryption algorithm will vary according to specific requirements of the institution that issues the credit card.

File Screening

Figure 5:
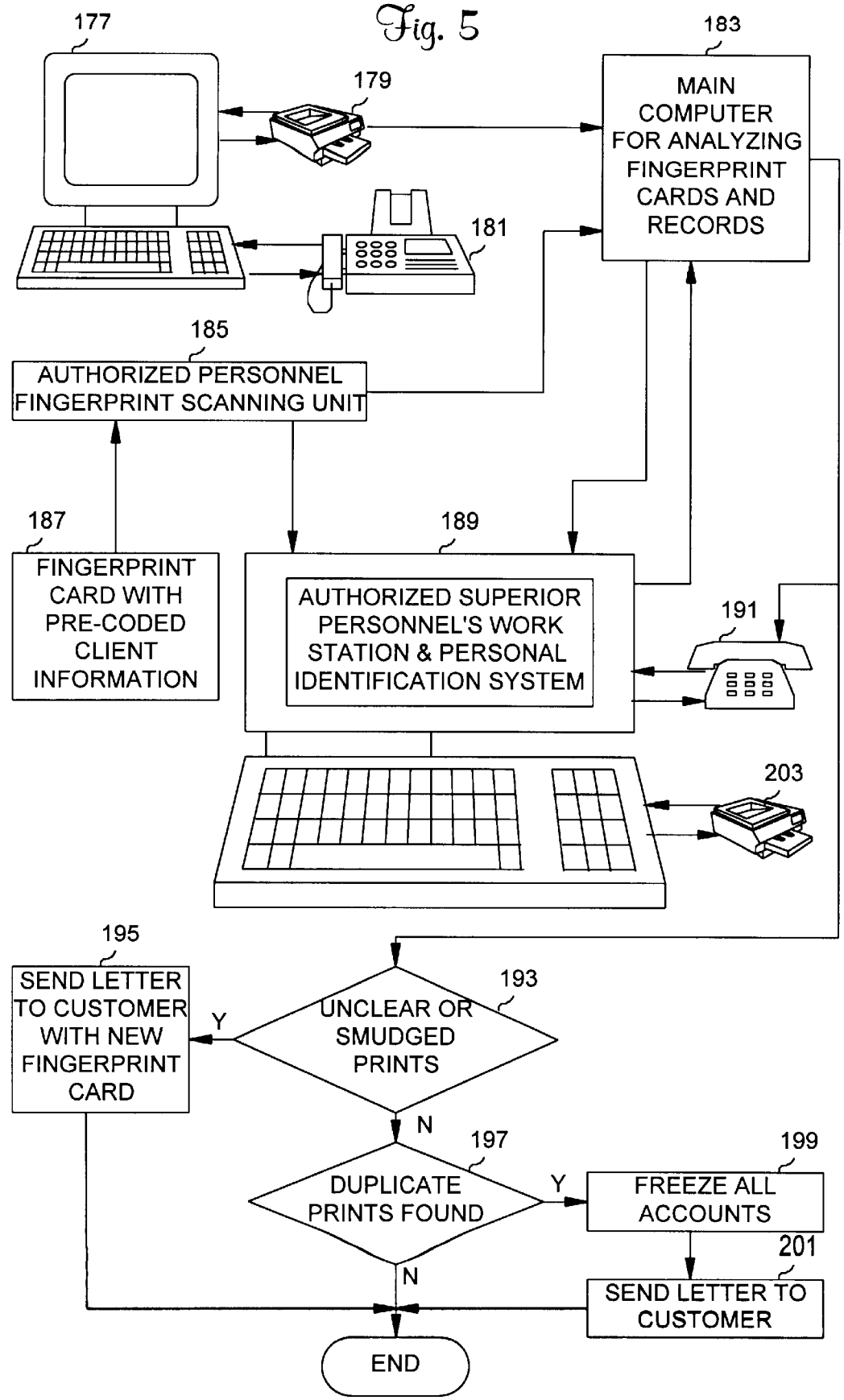
FIG. 5 is a block diagram showing a fingerprint mismatch method compatible with the present invention.

Financial institutions typically have already sorted and stored client files on the basis of account numbers and the name and address of each individual card holder. In the preferred system, also added into the institution's existing computer network is a fingerprint analysis and identification device, much like the one presently being used by law enforcement agencies such as the U.S. Federal Bureau of Investigation, with a large capacity and capable of scanning a large volume of fingerprints. The fingerprints which are scanned by these units or the ones at the merchant site cannot be manipulated fraudulently in any way. FIG. 5 shows how the preferred analysis unit 183 reads a fingerprint from a fingerprint form 187 and translates and sends a message to the receiving FPS and AID database 189 via communications device 191. The FPS and AID processing units temporarily store the converted information in the G file. The preferred screening process starts with a system check for unclear or smudged prints at 193. If the prints are not legible, a letter is typically sent to the user at 195 explaining the problem along with another fingerprint form to fill out. The preferred screen process then looks for a match of the scanned fingerprints with previously recorded fingerprints at 197 to see if there is already a record of the fingerprints under a different name. If there is a match, then all information is logged in the F file, the accounts are frozen at 199, the accounts users are sent a letter at 201 explaining the problem along with another fingerprint form to fill out, and the information is permanently stored in the G file with the appropriate user record. Before the scanning unit starts the conversion of any finger print card that has been inserted for that purpose, the preferred system asks the operator to verify if the prints being requested for scanning are clear and legible prints. The operator provides verification, then in the case of a new application provides his or her own fingerprint.

Operator Verification

Further preferred features of the present system follow below. During initial set up where fingerprints are being read from the customer returned fingerprint forms, it is not necessary to screen the operator on every fingerprint, since it is known they have been received from a customer. A fingerprint form that does not have specific customer information coded on it will not be accepted by the system. During the initial data entry stage, an operator is only required to provide identity verification at the time they start a session at their work station 133. If a work station 133 is left unattended for previously specified period of time, the work station 133 disconnects from the system and the operator is once again required to provide identity verification. Separate from this verification of the operator, there is a random operator verification during the time the system is being used to input data. Operator verification is required on every new application or at any time when an existing client file has been manipulated.

Note Pad Rider

During the time when initial fingerprint data for existing customers is being entered in to the system, followed with a screening of those prints, if matching prints are found under different names, the matching accounts are sorted and entered onto the note pad file as a "rider". The flagged accounts are then distributed to authorized personnel in a queuing system for further screening, and a letter is sent to the owners of all accounts explaining that there is a identification problem that must be resolved before the accounts can be used. Only after screening can the accounts be put back into the system as legitimate accounts. Until then the accounts stay as inactive accounts on the system. If a user tries to use one of the inactive accounts before it has been marked as valid, the merchant is instructed to contact an employee who informs the customer that there is a pending identification problem which the customer needs to take care of and that the account is inactive and an authorization cannot be given at that time. A notation of is then recorded onto a rider note pad file and is shared on all of the regional clearing note pad files. If after this incident and being advised by an employee that the customer should refrain from using that card, if the customer attempts to use the card again, approval is denied and local law enforcement authorities are notified of a potential fraud.

Rider note pad entries are similar to regular note pad entries but are not time controlled. Rider files are integrated with the flagged user files, which stay in the system as inactive accounts for a predetermined number of days from time of notification of the user. Typically, a legitimate customer responds in a short period of time. If the customer has not responded or made an effort to correct the problem, then the account is classified as fraudulent, removed from the system, and all of the information is transferred to the F file. When a flagged account drops out of the system, the corresponding rider file also drops out of the note pad file. No other steps can override this precedence by the rider entries in the note pad. If at some time later the card is used again, the corresponding account will not exist in the system, and approval is not granted.

Counterfeit credit cards will not work on the preferred system, since approval is not given for cards without corresponding fingerprints which match at both merchant site and the system, along with personal identification information. If a counterfeit card has been produced using an existing legitimate account number, then the prints on file for that account would not match those of the perpetrator.

Fingerprint Imaging Device

Figure 10:
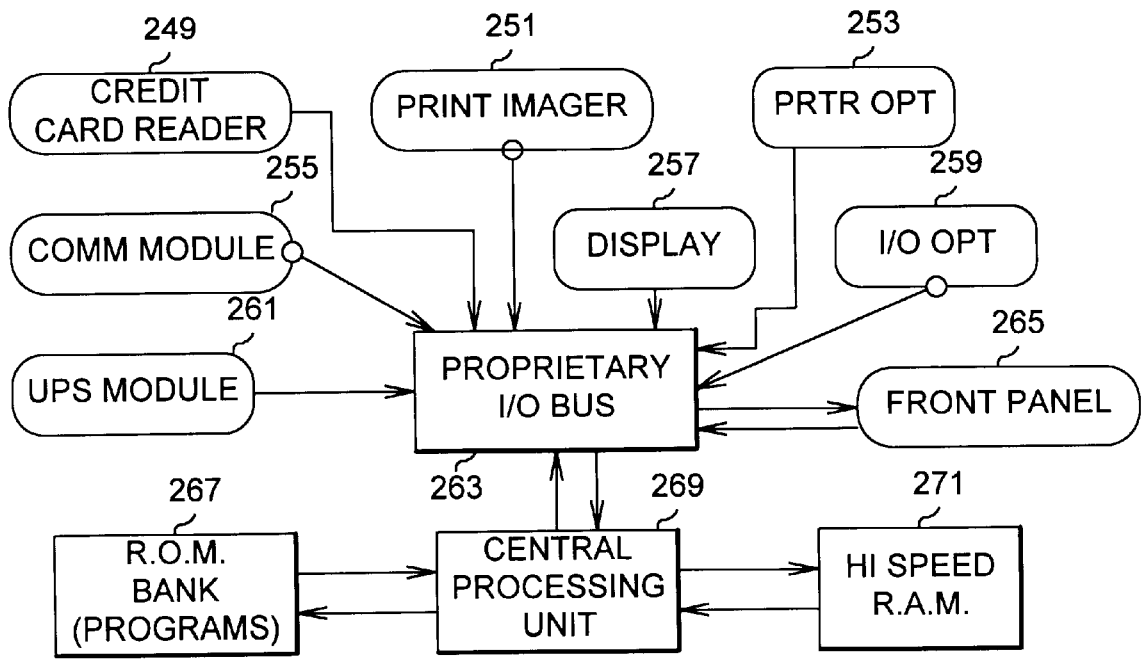
FIG. 10 is a block diagram of the schematic of a card verification apparatus compatible with the present invention.

The imaging device at the merchant site may be similar to the one used at the financial institution. The unit preferably scans the fingerprint of a finger that has been placed on it, translates it into a computer readable format, and then transfers the information over communication lines to the centralized system at the main clearing facility, as shown by FIG. 10. A microprocessor or other such processor 269 with ROM 267 and high-speed RAM 271 connect to a data I/O bus 263 powered by a UPS 261. The processor 269 processes data going to and coming from a front panel 265, a display 257, printer 253 and other optional I/O devices 259. A card reader 249 is typically also connected to the data bus 263 for reading account information encoded on a credit card. A fingerprint image scanner 251 reads a customer's fingerprint, while a communication module 255, typically comprising a modem, sends and receives information to and from remote devices via standard telephone lines, or other such communication lines.

The imaging device is the remote field input device for all customer transactions. Input is a credit card or other such card provided by a customer. The card reader preferably reads and translates card account information into binary data that is routed to the processor 269 via data bus 263. Under ROM based, RAM resident program control, the data is routed to the communication module 255 and forwarded to the central system containing various databases. This packet of data contains customer credit card data as well as fingerprint information obtained by prompting the customer via LED or other indication means on front panel 265. Upon activation of the fingerprint imaging scanner 251, the fingerprint information is via a grid system converted into a binary format, and along with credit card account information is routed together for verification.

The UPS module 261 insures that in the event of power loss that existing transactions can be completed and a graceful system shutdown occurs. The UPS module 261 is integrated into the data I/O bus 263 design and under processor 269 control alerts the merchant via the front panel 265 when power may be a problem.

The ROM memory 267 contains operational programs that are shadowed in the high speed RAM 271 for optimum speed. The data I/O bus 263 design includes a separate processor for allowing I/O functions such as print imaging and communications to take place in parallel to program operations. There are no processor wait states required due to the coprocessed data I/O bus 263 and the use of high speed RAM 271. The RAM used here is preferably in the 20 nanosecond range.

The printer module 253 allows an audit trail of unit activity, and can be paper or microfiche. The spare I/O option 259 is reserved for future customer enhancements. One skilled in the art will recognize that other equivalent hardware may be substituted for the above without loss of generality.

The merchant runs a customer's credit card through the card reading equipment 249, which allows the merchant access to the clearing house of the financial institution via the communication module 255. As soon as the customer is ready to take care of the charge, the customer places a finger on a scanning surface 251 instead of or in addition to signing a voucher. Upon a completed and approved charge the merchant then gives the customer a receipt printed by printer 253, just as is currently done. The process of taking fingerprints on the imaging device is automatic and does not involve any action on part of the merchant.

Figure 11:
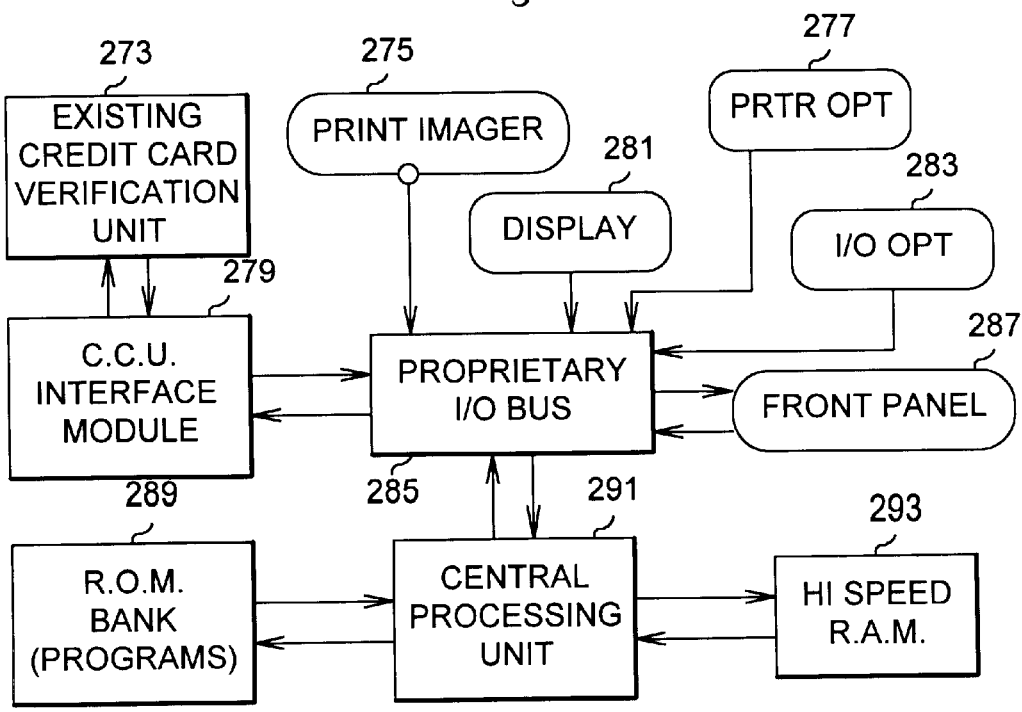
FIG. 11 is a block diagram of the schematic of a card verification upgrade apparatus compatible with the present invention.

A unit similar to the merchant unit is used to upgrade existing credit card verification equipment at the institution site, as shown by FIG. 11. A microprocessor or other such processor 291 with ROM 289 and high-speed RAM 293 connect to a data I/O bus 282. The processor 291 processes data going to and coming from a front panel 287, a display 281, printer 277 and other optional I/O devices 283. A credit card unit interface module 279 interfaces to an existing credit card reader and verification unit 273 is also connected to the data bus 285 for reading account information encoded on a credit card. A fingerprint image scanner 275 reads a customer's fingerprint.

In merchant sites such as restaurants, it may not be practical to have a stationary imaging system. For such merchants, a stationary base unit is placed wherever is convenient for the establishment, and a separate mobile hand-held scanning unit is provided to bring to customers.

Figure 8:
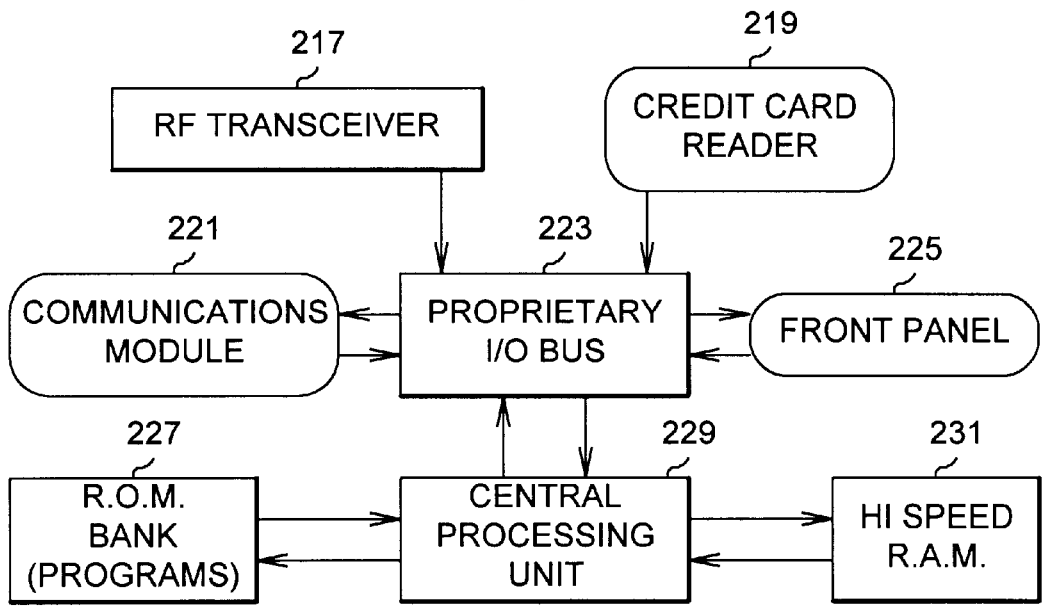
FIG. 8 is a block diagram of the schematic of a mobile card verification base unit apparatus compatible with the present invention.

A base unit compatible with the present invention is shown in FIG. 8. A microprocessor or other such processor 229 with ROM 227 and high-speed RAM 231 connect to a data I/O bus 223. The processor 229 processes data going to and coming from a front panel 225. A credit card reader 219 is also connected to the data bus 223 for reading account information encoded on a credit card. A communication module 221, typically comprising a modem, sends and receives information to and from remote devices via standard telephone lines, or other such communication lines. A radio frequency (RF) transceiver 217 sends and receives data to and from the mobile hand-held unit via radio waves.

The base unit serves as the central unit connected to communication lines for the purpose of opening accounts, verifying identity, and communicating with the portable hand-held units in developing account charge information and updating central account information.

This card reader 219 is typically used to access the processor 229 via the data I/O bus 223 to open up communications programs stored in ROM 227 but later transferred to high speed RAM 231. Upon executing this program, credit card account information is preferably routed to the communication module 221 to establish a connection between a remote mainframe and the base unit via a telephone line. This process happens parallel to RF communication via the RF transceiver 217 and a mobile hand-held unit. Under separate program control, the hand-held mobile unit typically is exchanging fingerprint information and transaction amounts with the base unit for routing through the data I/O bus 223. Transmission data is typically sent via the communication module 221 to a remote mainframe computer.

Front panel operator controls typically comprise a series of fingerprint imaging status lights, error lights, transmission lights and a simple LCD display unit, all receiving data and control from the processor 229 via the data I/O bus 223. One skilled in the art will recognize that other equivalent hardware may be substituted for the above without loss of generality.

Figure 7:
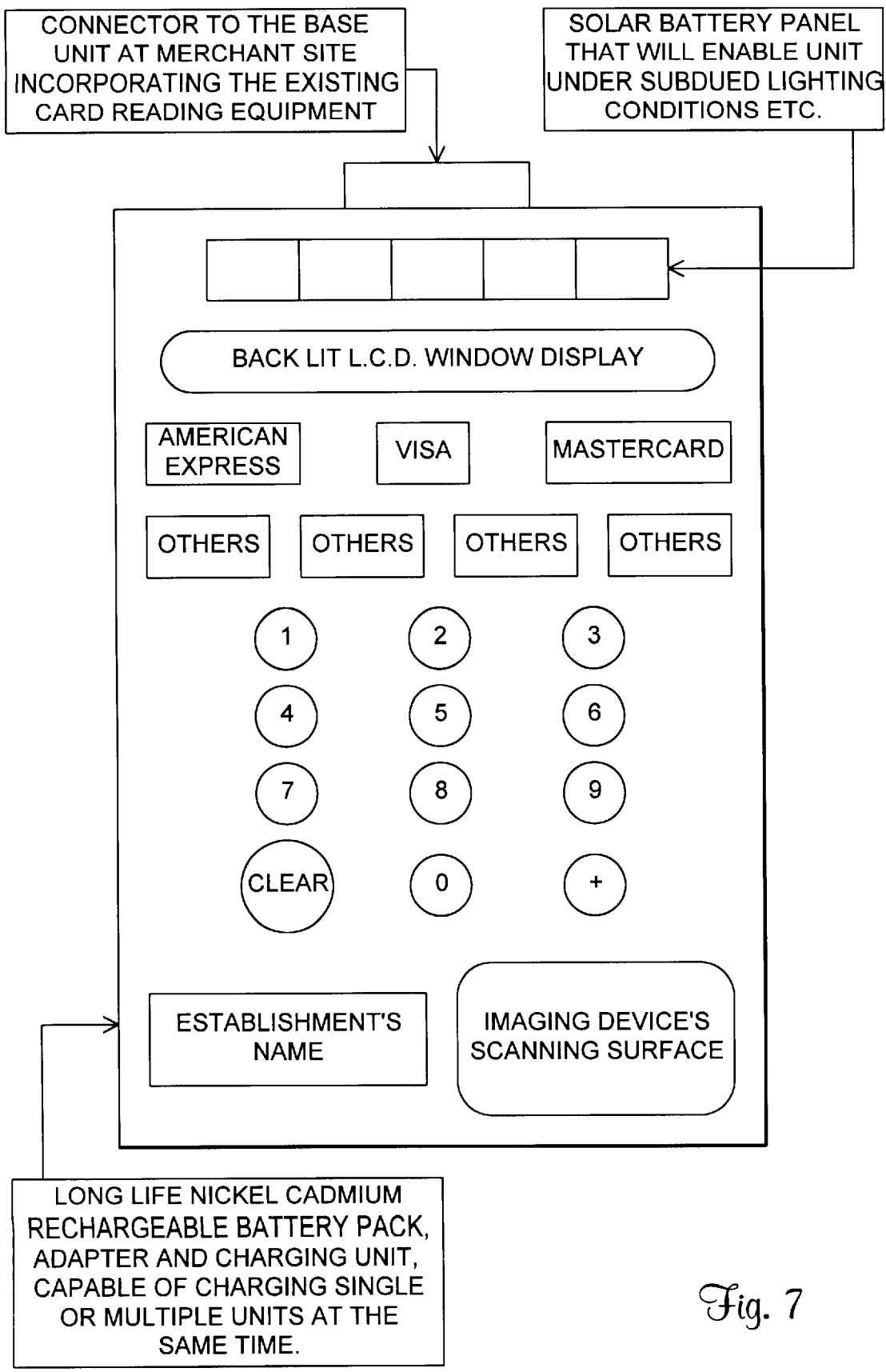
FIG. 7 is view of the front of a hand-held mobile card verification apparatus compatible with the present invention.
Figure 9:
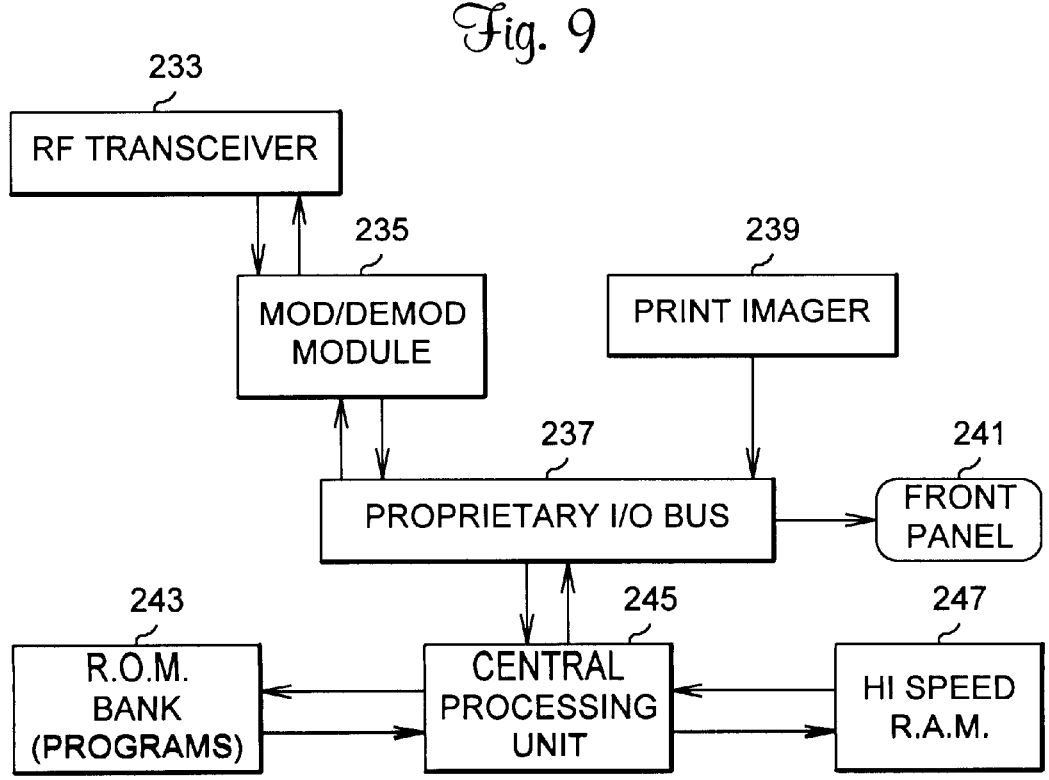
FIG. 9 is a block diagram of the schematic of a mobile card verification apparatus compatible with the present invention.

Much of the working components of the mobile hand-held unit are similar to the stationary merchant scanning unit. The units are designed with numbers from 0 through 9, and with buttons identifying the types of credit cards the merchant accepts. The display of the unit may be back lit, as shown in front panel view of FIG. 7. A microprocessor or other such processor shown in FIG. 9, 245 with ROM 243 and high-speed RAM 247 connect to a data I/O bus 237. The processor 245 processes data going to and coming from a front panel 241. A fingerprint imaging device 239 is also connected to the data bus 237 for scanning and encoding a customer's fingerprint. A communication modulation/demodulation module 235 encodes and decodes information to be sent and received to and from the base unit via an RF radio transceiver 233.

Fingerprint Analyzing and Encoding System

A fingerprint identification system (FIS) combining hardware and software components is used to identify an individual by a computed scan of one of their fingerprints. The system relies on the fact that fingerprints are unique to an individual and that general classifications can be made from a computerized scan.

Preferably, all fingerprints of an individual are initially scanned and reviewed by the FIS in order to select the most unique print from each hand. Typically, two prints are then encrypted by the system for suitable identification applications.

The fingerprint scanning apparatus previously shown in FIG. 2, 143, provides a mechanism for physically scanning a fingerprint and providing a raster bitmapped image to the FIS for further processing and analysis. Typical well-known fingerprint scanning devices compatible with the present invention include those of U.S. Pat. No. 5,222,152, issued Jun. 22, 1993, to Fishbine et al.; U.S. Pat. No. 4,811,414, issued Mar. 7, 1989, to Fishbine et al.; and U.S. Pat. No. 4,787,742, issued Nov. 29, 1988, to Schiller et al.; all three of which are herein fully incorporated by reference. As there are many fingerprint scanning devices that are well-known within the art, it will be recognized that any number of these other well-known fingerprint scanning devices may be substituted for the above-identified well-known fingerprint scanning devices without loss of generality.

The present FIS generally classifies fingerprints in real time, and is based on the well-known research performed by Sir Edward Richard Henry and further by the United States Federal Bureau of Investigation.

Typical classification systems classify a set of all fingerprints from both hands, each fingerprint according to a generalized classification type. In the present system, only those prints of highest interest are classified and numerically encoded according to specific micro-features contained within the fingerprint.

The present FIS classifies the fingerprints into one of three main groups consisting of 1) arches, 2) loops, and 3) whorls. Whorls can be broken down further into eight distinct patterns consisting of 1) plain arch, 2) tented arch, 3) radial loop, 4) ulnar loop, 5) accidental whorl, 6) central pocket loop whorl, 7) double loop whorl, and 8) plain whorl. In general, the three main classifications consist of 5% arches, 65% loops and 30% whorls across the population as a whole.

The present FIS keys specifically on the center of a pattern area for loops and whorls, which accounts for approximately 95% of the fingerprints across the population. The remaining 5%, arches, tend not to have a specific pattern area.

Pattern Area (delta/Core)

Figure 27:
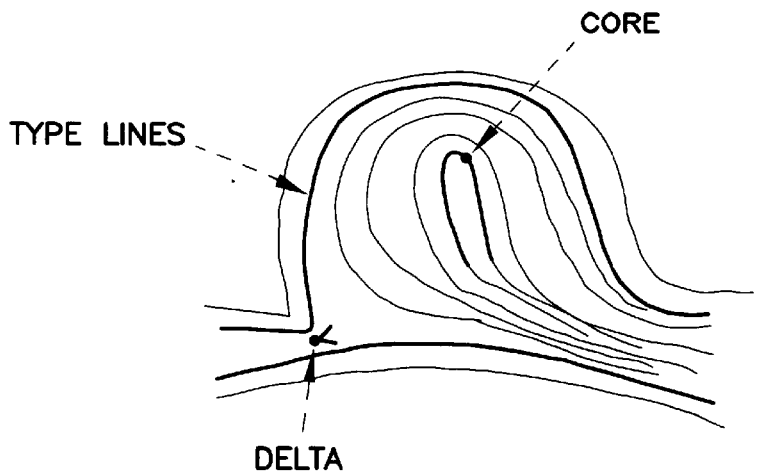
FIG. 27 is shows the elements of a typical fingerprint compatible with the present invention.

A pattern area may be defined as that area which encompasses a core point and a delta point via a line type border as shown in FIG. 27. A line type border may be made up of the two most central ridges which run parallel to, diverge and then encompass the pattern area. The line type border may contain broken or continuous lines, but typically does not contain angular formations unless they diverge from the same point and completely surround the pattern area.

A delta may be defined as the first feature obstruction in front of and closest to the center of divergence of type lines. A bifurcation is typically a point on a fingerprint where two or more ridges come together or split. A delta may comprise any feature, but if there is a choice between multiple bifurcations, then the bifurcation nearest the core will usually be the delta. Rods are typically defined as ridges in the centermost loop which do not have a recurve ridge and may or may not abut the centermost loop.

Figure 28A:
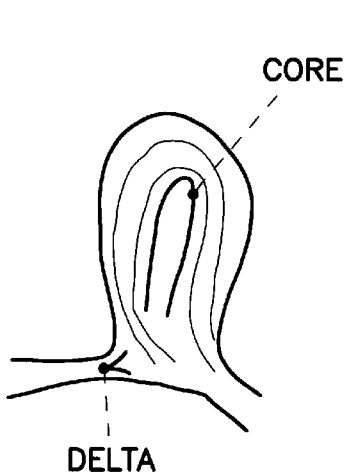
FIGS. 28a through 28e show how delta, core, and shoulder points are determined on a loop with the present invention.
Figure 28B:
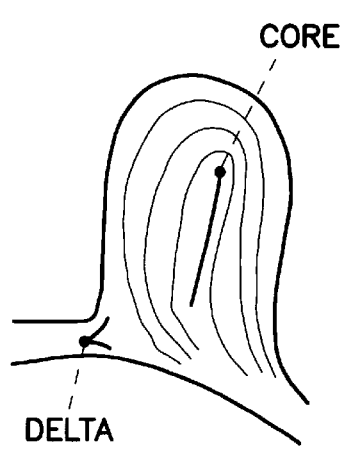
Figure 28C:
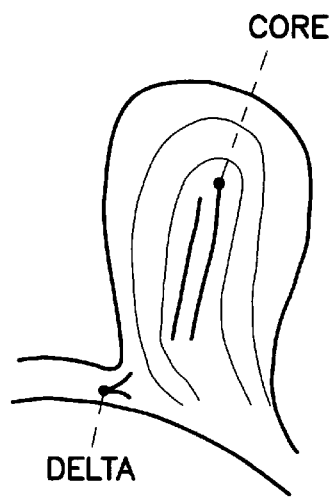
Figure 28D:
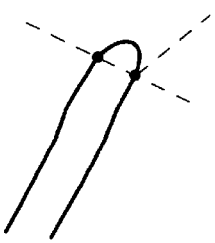
Figure 28E:
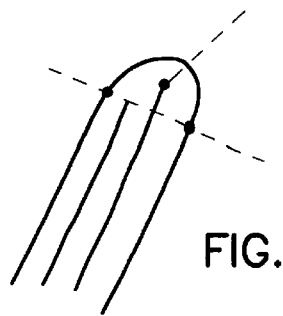
Figure 29A:
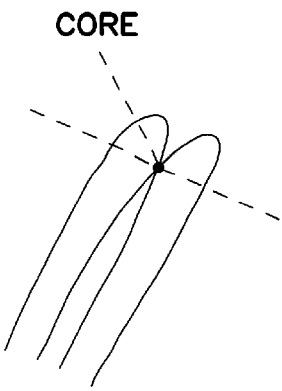
FIGS. 29a and 29b show how overlapping shoulder points are determined with the present invention.
Figure 29B:
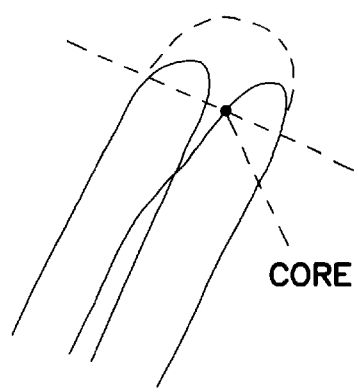

A core typically is defined as the topmost shoulder point (FIG. 28d) furthest from the delta in the center of the print on the innermost loop, recurve, or rod with the following rules and definitions. In FIG. 28a, the core is located on the shoulder farthest from the delta when there are no rods which extend past the shoulders of the innermost loop. In FIG. 28b, the core is located on the topmost end of the center rod when there are an odd number of rods which rise above the innermost loop shoulders (FIG. 28e). In FIG. 28c, the core is located on the topmost end of the rod furthest from the delta of the center pair of rods when there is an even number of rods which extend past the shoulders of the innermost loop. In FIG. 29a, the core is located at the point of intersection when two loops overlap at the shoulder. In FIG. 29b, when two loops overlap below the shoulder points, they are treated as one loop with two more rods and rod classification rules then apply.

Innermost Loop Requirements

The selection of a central loop typically determines the location of the core. The center loop does not include any appendage which is above the shoulders and attaches to another ridge at a 90° angle. If it does, then the next loop out is selected as the innermost central loop. In addition, the central loop should cross or touch an imaginary line drawn between the core and delta. If this condition is not met, then once again the next loop out is chosen as the central loop.

Classification of a Loop Pattern

A loop pattern is usually identified by ridges that enter and exit on the same side of a pattern which intersect an imaginary line from the core to the delta. A loop pattern should satisfy the innermost loop requirements, contain a delta, and have at least one ridge count between the core and delta. A ridge count may consist of any ridges which intersect or touch a vector from the core point to the delta point, as shown in FIG. 32, vector (c). If this vector intersects a fork (bifurcation) then both legs of the fork are typically counted. Line fragments and dot intersections are also counted if they meet the minimum feature condition.

A minimum feature is typically defined by the FIS scan cleanup process. The FIS unit filters the scan according to a set of predetermined resolution rules. Features which remain following the filtering process meet the minimum feature condition.

Figure 30A:
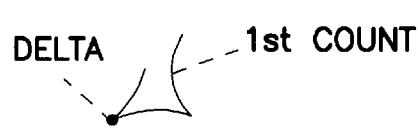
FIGS. 30a and 30b show how a delta is determined with the present invention.
Figure 30B:
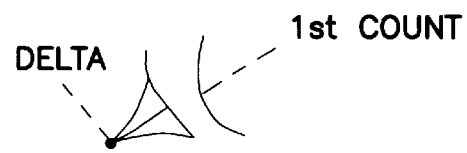
Figure 31A:
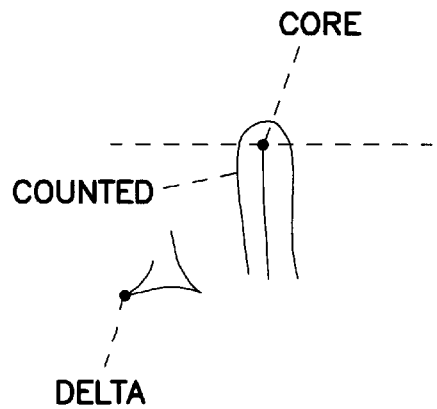
FIGS. 31a and 31b show delta point and ridge counting with the present invention.
Figure 31B:
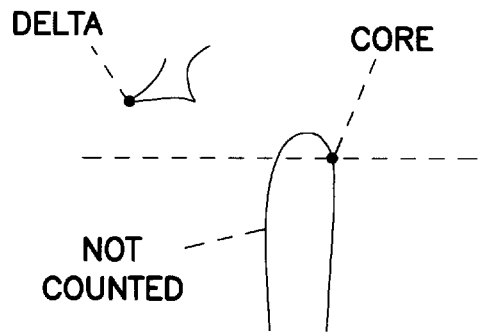

The core and delta points are usually not included in the ridge count. There are two special ridge count rules:

1) There should be a clear space (opening) between the delta and the first ridge to be counted as shown in FIGS. 30a and 30b.
2) The first ridge from the core is typically not counted if the delta point falls above a line drawn tangent to the core location as shown in FIGS. 31a and 31b.

FIG. 32 shows how the FIS generates a control word, typically 16 bits, from specific characteristics of the loop patterns as follows:

1) The scan is preferably electronically filtered according to the minimum feature rules.
2) The core and delta coordinate points are located according to the rules discussed above.
3) A vector (b) is typically projected from the core parallel to the center and in the direction of the innermost loop.
4) A vector (a) is typically projected from the delta in a direction to intersect vector (b) at a 90° angle. This intersection forms an origin coordinate point.
5) A vector (c) is typically projected to connect the core and delta points, forming a right triangle with sides (a), (b), and (c).
6) The fingerprint scan is typically normalized by rotating around the origin until vector (a) is parallel with the x-axis and vector (b) is parallel with the y-axis.
7) The core and delta coordinates are usually recorded.
8) The area of the right triangle formed by vectors (a), (b), and (c) is computed.
9) The ridge count along vector (c) is typically computed.
10) Ridge crossings for vectors (a) and (b) are typically computed.
11) The ridge counts, core coordinate, delta coordinate, loop classification and triangle area are typically encrypted into a numerical ID key.

Classification of a Whorl Pattern

As shown in FIG. 33, a plain whorl pattern usually requires two deltas and one or more ridges which make one or more complete revolutions between the delta points, such that a line drawn between the delta points intersects one or more ridge revolutions. Whorl pattern centers may be made up of ridges which form spirals, ovals, circles or other circle like structures.

FIG. 34 shows that a central pocket loop pattern is typically the same as a plain whorl except that a line drawn between the deltas does not intersect or touch any complete revolution ridges.

Figure 35:
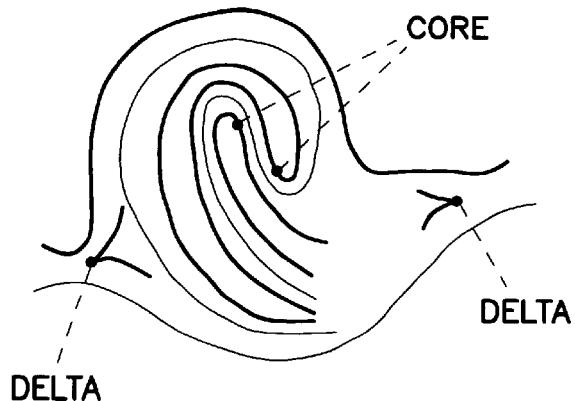
FIG. 35 shows the determination of delta points of a double loop whorl pattern compatible with the present invention.

A double loop whorl pattern usually consists of two distinct identifiable loop patterns side by side, as shown in FIG. 35. The loop pattern rules discussed above typically apply for locating the deltas and center cores.

An accidental whorl pattern is typically made up of a combination of the previously mentioned patterns (not including a plain arch pattern) combined with two or more identifiable deltas.

For whorl classifications, the FIS preferably uses the same rules discussed above for the loop pattern for the generation of the control word, except for the following differences:

1) The leftmost core and delta are usually chosen as the points of computation.
2) The topmost centerpoint of the vertical axis (before scan rotation) of the innermost circle, spiral, oval or other circular pattern is typically selected as the core point.
3) The vertical axis is usually defined as a line running parallel through the center of the circular type pattern tangent to the delta.

Other rules and processing steps for the whole pattern are the similar to the loop pattern method.

Classification of Plain or Tented Arch Pattern

Figure 36A:
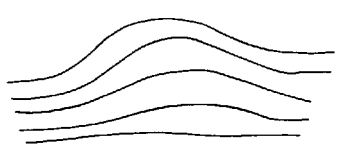
FIGS. 36a and 36b show a plain arch and a tented arch compatible with the present invention.
Figure 36B:
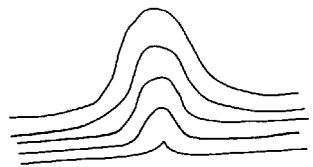

Arch patterns are typically identified as ridges that flow from left to right in a wave-like manner without any identifiable characteristics which can classify them as a loop or whorl. The wave-like pattern for a plain arch usually has an angle of 45° or less as shown in FIG. 36a. Arches with angles greater than 45° may be classified as tented arches as shown in FIG. 36b.

Figure 37A:
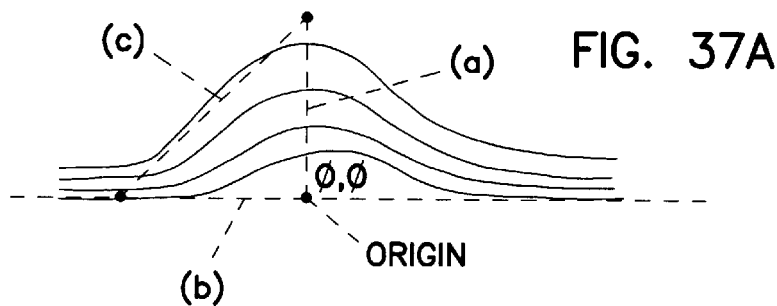
FIGS. 37a and 37b show the determination of vectors on an arch with the present invention.
Figure 37B:
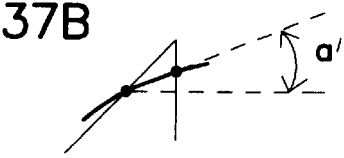

Since arch patterns tend not to have as many unique features as loops or whorls, they are typically the last choice for use in a fingerprint identification system. However, since it is theoretically possible for an individual to have only arch prints, the following FIS procedure is followed as shown in FIG. 37a:

1) Locate bottom-most wave with a minimum angle and designate it as a base wave. The base wave sets the y-axis origin for the vector (a) of a predetermined length.
2) Locate the center of the wave. This determines the x-axis for the origin of vector (a).
3) Normalize the fingerprint scan by rotating the scan around the vector (a) origin until vector (a) is at a 90° angle with the original base line y-axis origin.
4) Set the length of vector (b) equal to that of the predetermined length of vector (a), and locate vector (b) from the origin of vector (a) and to the left at a 90° angle. Connect the end points of vectors (a) and (b) to form vector (c), thereby completing a right triangle.
5) Perform a ridge crossing count for vector (c) and vector (a).
6) Locate the uppermost wave which crosses both vector (c) and vector (a), and note the crossing coordinates. Determine the angle of corner (a') formed by these coordinates (FIG. 37b, exploded view).
7) Use the rotation angle required in Step 3 along with ridge crossings in Step 3 and angle (a') in Step 6 to generate the ID control word for this print.

Complex Vector Analysis

Figure 39:
FIG. 39 is a complex vector showing two bifurcation points.
Figure 40:
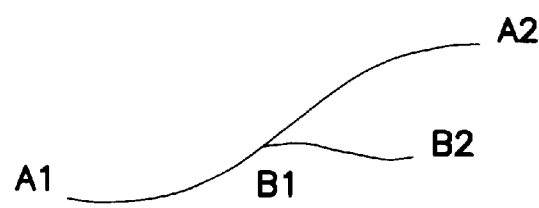
FIG. 40 is a complex vector showing one bifurcation point.
Figure 41:
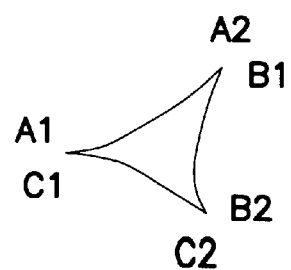
FIG. 41 is a complex vector showing three bifurcation points.

FIGS. 39 through 41 show three examples of possible complex vector types. These complex vectors are broken down into simple line type components and bifurcation coordinates.

The vector shown in FIG. 39 is typically broken down into two line types consisting of $A_1A_2$ and $B_1B_2$. The intersection of these two line types are noted as bifurcation points. The vector shown in FIG. 40 is typically broken down into two line types consisting of $A_1A_2$ and $B_1B_2$. The intersection of these two line types are noted as a bifurcation point. The vector shown by FIG. 41 is typically broken down into three line types consisting of $A_1A_2$, $B_1B_2$ and $C_1C_2$. The intersection of these line types are noted as bifurcation points consisting of $A_1C_1$, $A_2B_1$ and $B_2C_2$.

The complex vector analysis process is typically repeated for all other complex polygons which are part of the initial vector list.

Key ID Number Generation

Figure 22:
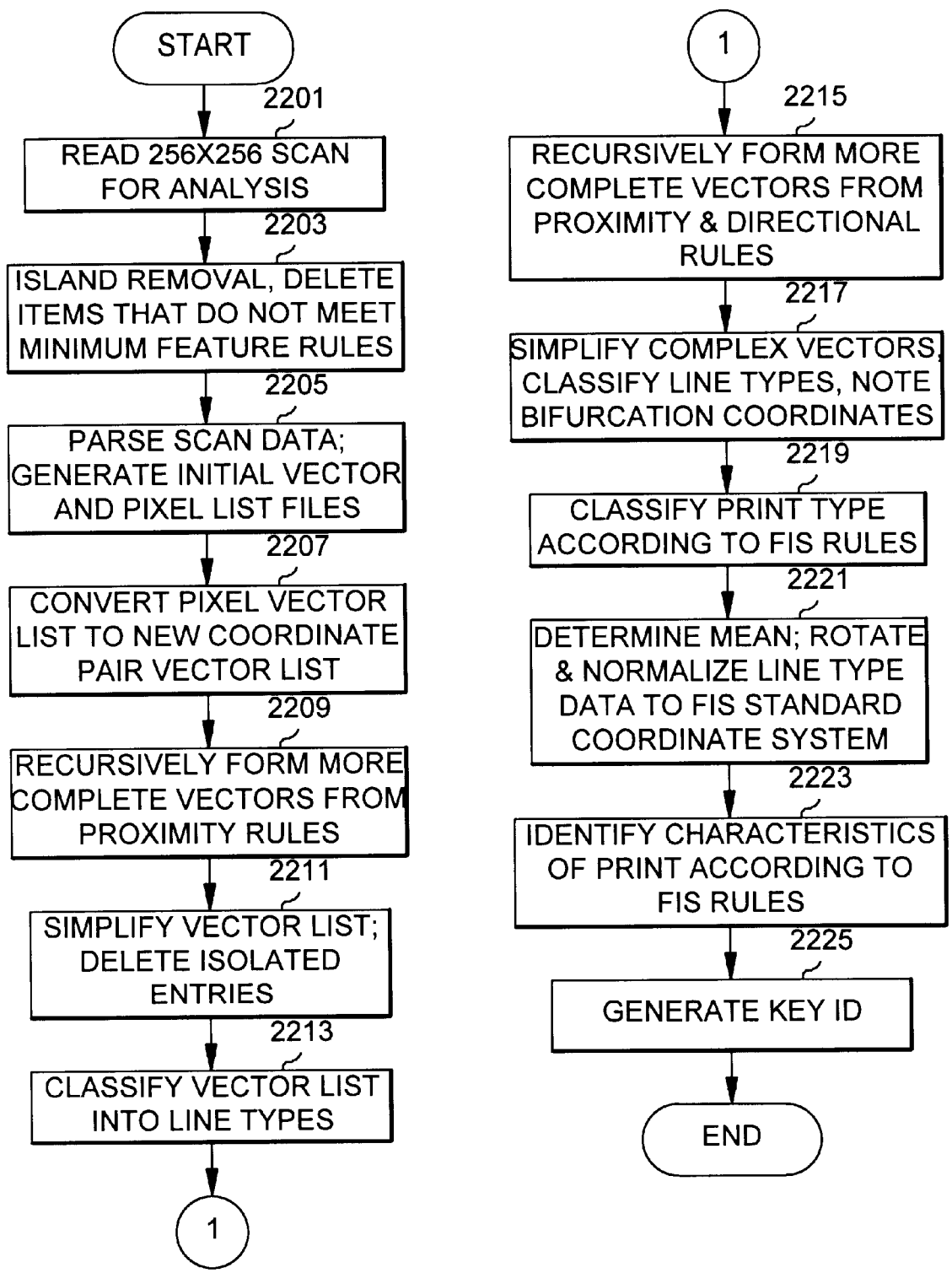
FIG. 22 is a flow diagram of the processing for scanning a fingerprint and producing a key ID number compatible with the present invention.

FIG. 22 shows a preferred method of processing for scanning a fingerprint and producing a key ID number. At 2201, a 256×256 resolution scan of a fingerprint is usually read for analysis. At 2203, scan items that do not meet minimum feature rules are deleted. The remaining scan data is parsed and initial vector and pixel list b-tree files are generated at 2205. The pixel vector list is then typically converted to a new coordinate pair vector list at 2207, and vectors are recursively formed according to proximity rules at 2209. At 2211, the vector list is usually simplified and isolated entries are deleted. The vector list is classified into line types at 2213, and more complete line types are recursively formed according to proximity and directional rules at 2215. Complex vectors are then broken down at 2217, and the line types are classified and bifurcation coordinates are noted. At 2219, the print type is preferably classified according to FIS rules, the geometric mean is determined, and the print is rotated and the line type data is normalized to the FIS standard coordinate system. Key characteristics of the print are identified according to FIS rules at 2223, and the key ID is generated at 2225.

EXAMPLE

Key 8-byte Key Generation for Loops and Whorls

A typical method for generating an 8-byte key for fingerprints classified as loops or whorls is given by the following:

1) Storing the delta coordinate, where the delta x and delta y values range from −999 to +999 with a 1 mil resolution within a possible area of 1 square inch relative to the origin.
2) Storing the core coordinate, where core x and y values range from −999 to +999 with a 1 mil resolution within a possible area of 1 square inch relative to the origin.
3) Storing the ridge count value along vector (c), which is typically an integer value from 1 to 63.
4) Storing the ridge count value along vector (a), which is typically an integer value from 0 to 63.
5) Storing the ridge count value along vector (b), which is typically an integer value from 0 to 63.

After storing the above five values, a preferred DES encryption procedure may be used when performing the following steps:

1) The 64 one-bit key values $K_1, K_2, \ldots, K_{64}$ are supplied by the data stored on the cardmembers credit card. Thus, the 64-bit information code assigned by the financial institution becomes the 64-bit cryptographic key. The data is card issuer dependent.
2) The 64 one-bit ID values $X_1, X_2, \ldots, X_{64}$ are supplied by the FIS scanner as follows:
   a) DX, DY, CX, CY are typically rounded to the nearest 20 mil value to compensate for variations in scan according to scan resolution.
   b) DX, DY, CX, CY are each converted to a binary 11 bit signed value where:

$DX=X_1-X_{11}$, $DY=X_{12}-X_{22}$, $CX=X_{23}-X_{33}$, $CY=X_{34}-X_{44}$ c) Vector (a), (b), (c) ridge counts are each converted to a 6-bit binary value where:

Ridge count $(a)=X_{45}-X_{50}$

Ridge count $(b)=X_{51}-X_{56}$

Ridge count $(c)=X_{57}-X_{62}$ d) $X_{63}$, $X_{64}$ are the print classification as follows:

| $X_{63}$ | $X_{64}$ | Class |
|---|---|---|
| 0 | 0 | Loop |
| 0 | 1 | Whorl |
| 1 | 0 | Arch |
| 1 | 1 | Reserved |

EXAMPLE

Maximum Key Generation

Maximum key generation may be required in law enforcement applications where the highest degree of analysis is used to determine who an individual is rather than whether they are a specific individual, as is the case in credit transaction applications.

For maximum key generation, all data may typically be transmitted as follows:

1) Delta coordinate.
2) Core coordinate.
3) Ridge counts for vectors (a), (b), and (c).
4) List of all line types within the pattern area by vector segment order, which are coordinate pairs that define the line segments that each line is comprised of.

Neural Network Approach

In the preferred FIS, a neural network is used to perform the fingerprint analysis in order to meet the time constraint of generating an identification code in less than two seconds, cost constraint of a price less than $200, and size constraint of fitting within 4"×6" area.

The preferred embodiment of the FIS neural network subsystem (NNS) is capable of resolving up to 60 million "if-then-else" decisions a second. The NNS performs several passes of data modification, analysis and conversion of the scanned point. In general, the preferred sequence is:

1) Scan the fingerprint and designate the scan as the master scan. Adjust the gray scale contrast to a black and white image as required.
2) Filter the scan to eliminate items which do not meet the minimum feature conditions. This requires several passes in the x and y axes at varying resolutions. Save the filtered scan as a master clean scan.
3) Grow the master clean positive data by the minimum resolution unit on edges of all ridges and features. Save this as a master grown scan.
4) Invert (compliment) the master grown scan and merge it with the master clean scan. Save this as a master merge scan.
5) Isolate all positive ridge bridges and save as a master bridge scan.
6) Merge the master bridge scan with the master clean scan and save as a master b scan. The original master scan is kept for possible transmission.
7) Filter the scan with an additive process using the master bridge scan locations to combine features that fall within two minimum resolution units. Save as the master clean scan.
8) Repeat Step 2 and save as the master clean scan.
9) Convert the master clean roster data to a vector list.
10) Analyze the vector list and classify according to the FIS fingerprint classification rules discussed above.

FIS Block Structure

Figure 38:
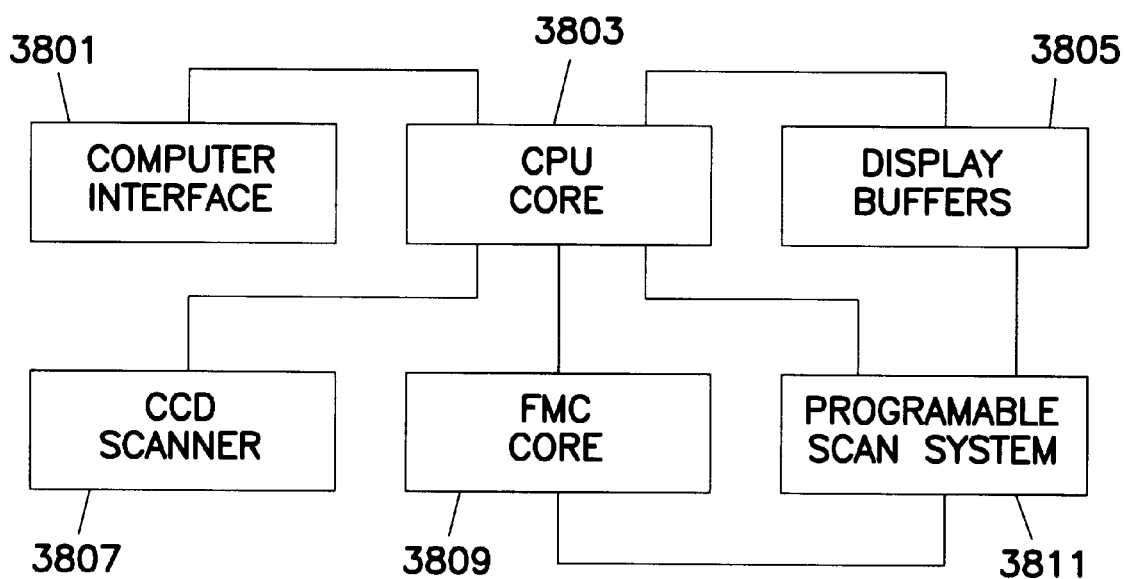
FIG. 38 is a block diagram of a module structure compatible with the present invention.

FIG. 38 depicts the communication paths between various logic sections of a preferred FIS system. The CPU core 3803 has direct bi-directional access to all logic sections and is typically the main control element of the system. The computer interface section 3801 provides for the bi-directional transfer of programs and data from the FIS unit to an external computer or other processing system. This interface may be used to transfer actual unmodified fingerprint scans complete with typically 256 levels of gray scale to an offline computer, along with all subsequent processing passes. This allows monitoring of the actual scan data as it is processed. Computer interface section 3801 also connects with existing standard credit card readers and other credit processing systems. This interface typically supports asynchronous or synchronous data transfer rates from 150 to 38K baud. For special applications, the interface supports downloading actual program code for execution by the FIS system.

The CCD scanner section 3807 provides for the scanning of a typically 256×256 pixel image of a fingerprint scan with 256 levels of grayscale. The scan process may be initiated by the CPU core 3803 and the resulting data may be read by the CPU code 3803 and written into the display buffers 3805. The initial scan is then typically transmitted to an external computer system for subsequent display or lookup process prior to actual FIS processing. The CCD scanner 3807 logic converts the typical 8-bit grayscale data into any bit resolution from the original 8-bit scale down to 1-bit (black and white only) via hardware initialized by the CPU core 3803. This allows for the fast translation of the scan data to a format suitable for subsequent processing in actual commercial applications. It will be recognized that scan resolutions other than 256×256 and gray scale levels other then 256may be processed by the system without loss of generality.

The display buffers 3805 contain typically up to eight copies of the scan image in various stages of processing under direction of the CPU core 3803. Copies of the scan are typically memory mapped into the display buffer as a 256×256 bit (8 kilobyte) image, where 1 is pixel on and 0 is pixel off. The entire display buffer preferably consists of 64 kilobytes of single bit read/writable memory. The CPU core 3803 selects one of the eight buffers by writing to a page select register, and all input/output (I/O) between the selected buffer and the CPU core 3803 is typically in a byte (8-bit) addressable format. The programmable scan system (PSS) 3811 has the ability to modify individual bits in the display buffers 3805 from any word size of 1 to 7 bits. This allows for fast pixel manipulation through program execution by the FMC core 3809 on data in display buffers 3805 and manipulated by the PSS 3811.

Figure 13:
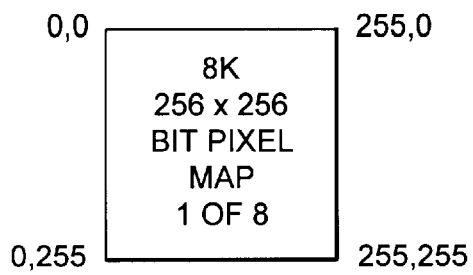
FIG. 13 is a memory map of an image area compatible with the present invention.

A typical display buffers 3805 memory map is shown in FIG. 13 with the following information:

BASE ADDRESS=(06000H)
WINDOW SIZE=8K from (06000H to 07FFFH) PAGE SELECT=1 of 8

The selected image page preferably grows down in memory. That is, a pixel at relative page address (0,0) may be mapped to memory address 07FFFH and the pixel at relative address (255,255) is mapped to memory address 06000H. It will be noted that the pixel at a relative page address of (0,7) has the same memory mapped address of 07FFFH where the CPU core 3803 read it, as each byte contains eight 1-bit pixels packed into a byte.

In the preferred embodiment of the PSS 3811, in conjunction with the FMC core 3809, provide for custom bit manipulation of the scan images in the display buffers 3805. The PSS 3811 main function typically is to read word variable size data from a display buffer, present it to the FMC core 3809 for processing, read the result from the FMC core 3809, and store it into display buffers 3805 as designated by the CPU core 3803. This results in a pixel manipulation of scan data rate of typically up to 30 million pixel operations per second with up to typically 16 decisions and 64 rules associated with each operation.

The PSS 3811 logic is designed to perform custom scans of word variable size data according to initialization instructions from the CPU core 3803 described below.

In general, blocks of pixel data may be presented to the FMC core 3809 where a block consists of an x by y area of pixel data from 1 to 7 bits wide. Non-square block sizes are allowed.

Figure 16:
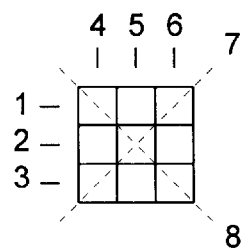
FIG. 16 is a 3×3 pixel mapping compatible with the present invention.
Figure 17:
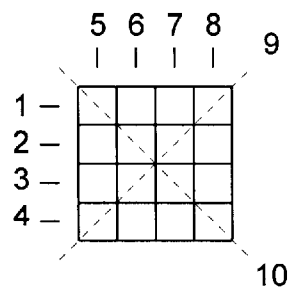
FIG. 17 is a 4×4 pixel mapping compatible with the present invention.
Figure 18:
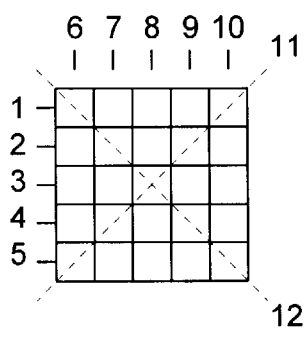
FIG. 18 is a 5×5 pixel mapping compatible with the present invention.
Figure 19:
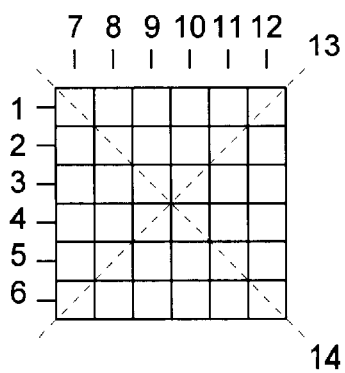
FIG. 19 is a 6×6 pixel mapping compatible with the present invention.
Figure 20:
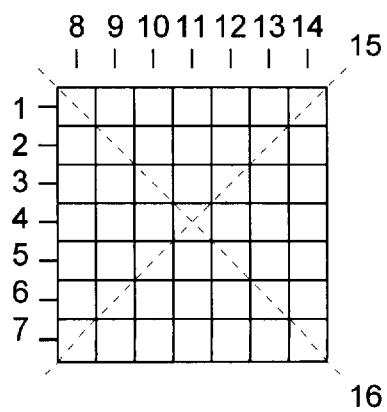
FIG. 20 is a 7×7 pixel mapping compatible with the present invention.

FIG. 16 shows a 3×3 bit block size where the rows are assigned numbers 1 to 3, the columns are assigned numbers 4 to 6, and the diagonals are assigned numbers 7 and 8. Given this example, the PSS 3811 logic presents data to the FMC core 3809 for processing in ID number in order 1 through 8 and then steps in the x axis by one pixel and repeats the operation until the x boundary has been reached (255,y). The y pixel base address is then incremented (x,y+1), and the process continues until the termination address or (255,255) is reached.

PSS Initialization

Figure 14:
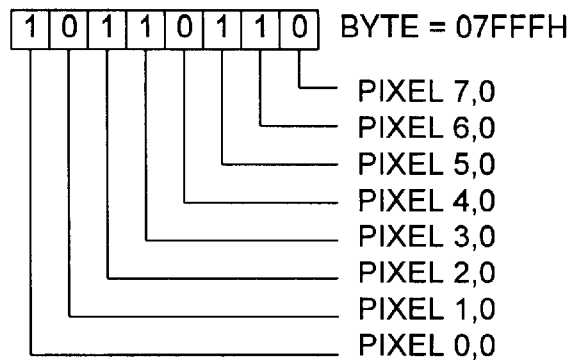
FIG. 14 is a core data word format compatible with the present invention.
Figure 15:
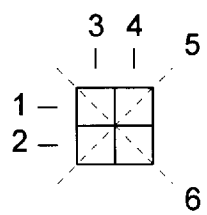
FIG. 15 is a 2×2 pixel mapping compatible with the present invention.

A complete understanding of typical PSS logic is best obtained by a study of the initialization requirements shown in FIG. 14.

1) Word size preferably is given in bits, where the size can be from 1 to 7 bits. Data may be read from the display buffers 3805 and presented to the FMC core 3809 according to the size definition. Data typically is presented to the FMC core 3809 in byte-size increments bit shifted to the least most significant bit (LSB) with unused bits forced to 0.

As shown in FIG. 14, if row 1 is being read of a 3-bit word with a base (x) address of (1,y), then pixels 1–3 of byte 07FFFH are shifted to the LSB and the unused bits are be filled with 0's, resulting in 00000011 being presented to the FMC core 3809.

2) The start address of scan processing typically is stored as least significant 13 address lines. Data processing begins at this address.

3) End address of scan processing typically is stored as least significant 13 address lines. Data processing is terminated when this address is reached.

4) The source buffer, stored as most significant 3 address lines, is typically used to select which 8 kilobyte buffer page data is to be read from for subsequent processing by FMC core 3809.

The mappings for word sizes from 2 to 7 bits are shown in FIGS. 15 through 20.

In the preferred embodiment, the FMC core 3809 performs pixel bit manipulation on data presented to it by the PSS 3811 according to a program which may be loaded from the CPU core 3803, but the FMC core 3809 executes several different programs during the fingerprint scan and analysis process. In general, the process order starts with initialization of the FMC core 3809 for execution. The initialization process is then repeated as required for each program to be run.

The preferred FMC core 3809 consists of a American NeuraLogix "Fuzzy MicroController" NLX230 and interface logic required for bi-directional I/O with the CPU core 3803 and PSS 3811. The fuzzy micro controller preferably contains a neural network core which executes "if-then-else" decisions based on a combination of 16 terms and 64 rules for each down-loaded program.

Given a 3×3 pixel block, the system typically performs complete conversion of an 8 kilobyte pixel page buffer in 2×516,128 operations, which takes approximately ⅓₀th of a second. This speed allows for substantial graphics analysis and manipulation in the time allotted for the application. In addition, the programmable concept of the system allows for the on-going refinement of an expert system without paying any significant execution time penalties or requiring any hardware changes.

As designed, the FIS system can be applied to a wide variety of expert vision recognition applications. It will be recognized that all previously described word sizes, pixel resolutions, and data transfer rates may be scaled upward or downward without loss of generality, depending on the needs of the application.

Hardware

Applicants' research has shown that effective vector transformation from flesh scans requires a minimum of 400×300 pixel elements. Therefore, the preferred embodiment of the present system uses a Panasonic CCD B/W Cameral Module Part #BS7259. The BS7259 module consists of a 512×492 pixel element CCD with EIA synchronization logic and outputs a live interlaced video output signal which can be displayed on a monitor in real-time applications that may include event recording. These characteristics are consistent with the FIS system design.

The CPU core 3803, FMC core 3809, and PSS 3811 elements are preferably implemented with a Texas Instruments TI-TMS320M500. This device directly supports the FIS vector transformation requirements, and performs a "Multiply and Accumulate" in single cycle times of 59 nanoseconds.

Initial tests of the preferred embodiment of the present invention show that the time required to perform a vector transform on 512×492 pixel array is as follows:

a) 512×492=251,904 pixel elements
b) Clock cycles per convolution=19 cycles
c) No. of Total clocks=4,786,176 per scan
d) @ 59 nsec=time=0.28 SEC per operation.

Typically only three passes are made on the 512×492 scan for conversion to a two-color black and white, ON/OFF pixel map. The resultant pixel map may then be scaled to a 256×246 pixel element array which results in a total time of 0.07 seconds per transform pass on the scaled image array.

The preferred TMS320M500 part also contains the "Computer Interface" 3801 function block with audio-analog to digital (A/D) input and D/A output to support the addition of high quality 16-bit voice recognition capability for the FIS systems.

Software

Figure 21A:
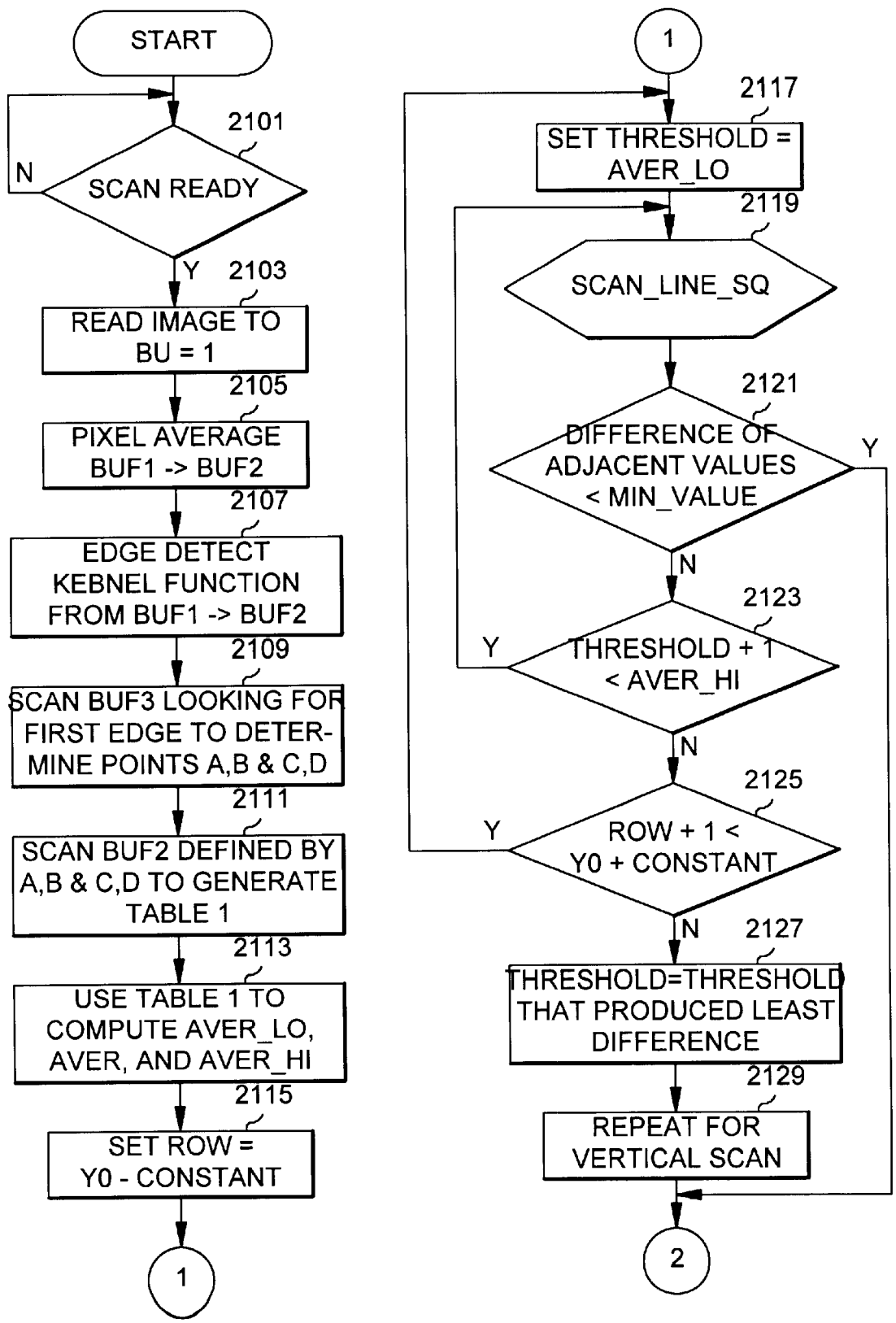
FIGS. 21a, 21b, and 21c are a flow diagram of a raster to vector conversion process compatible with the present invention.
Figure 21B:
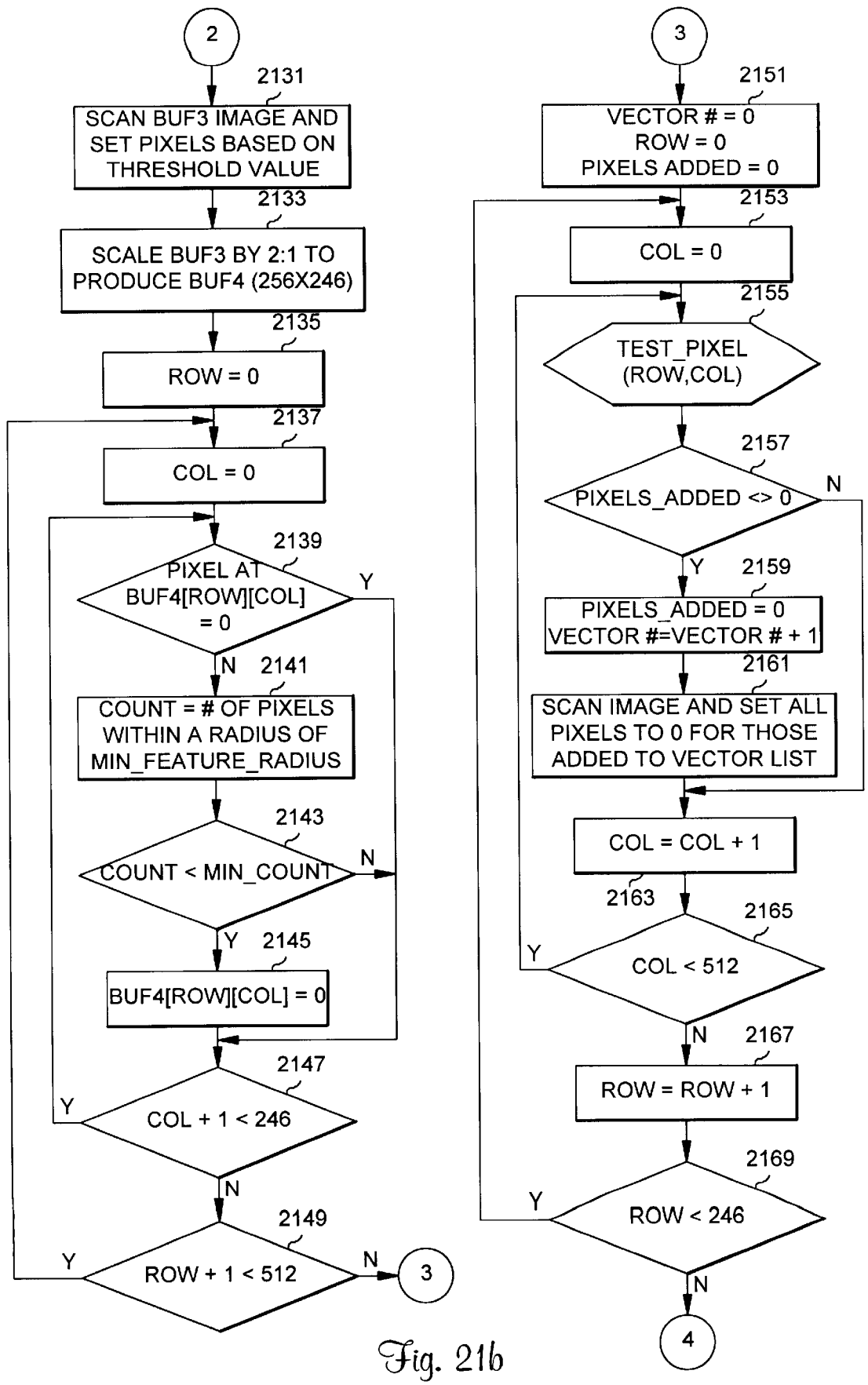
Figure 21C:
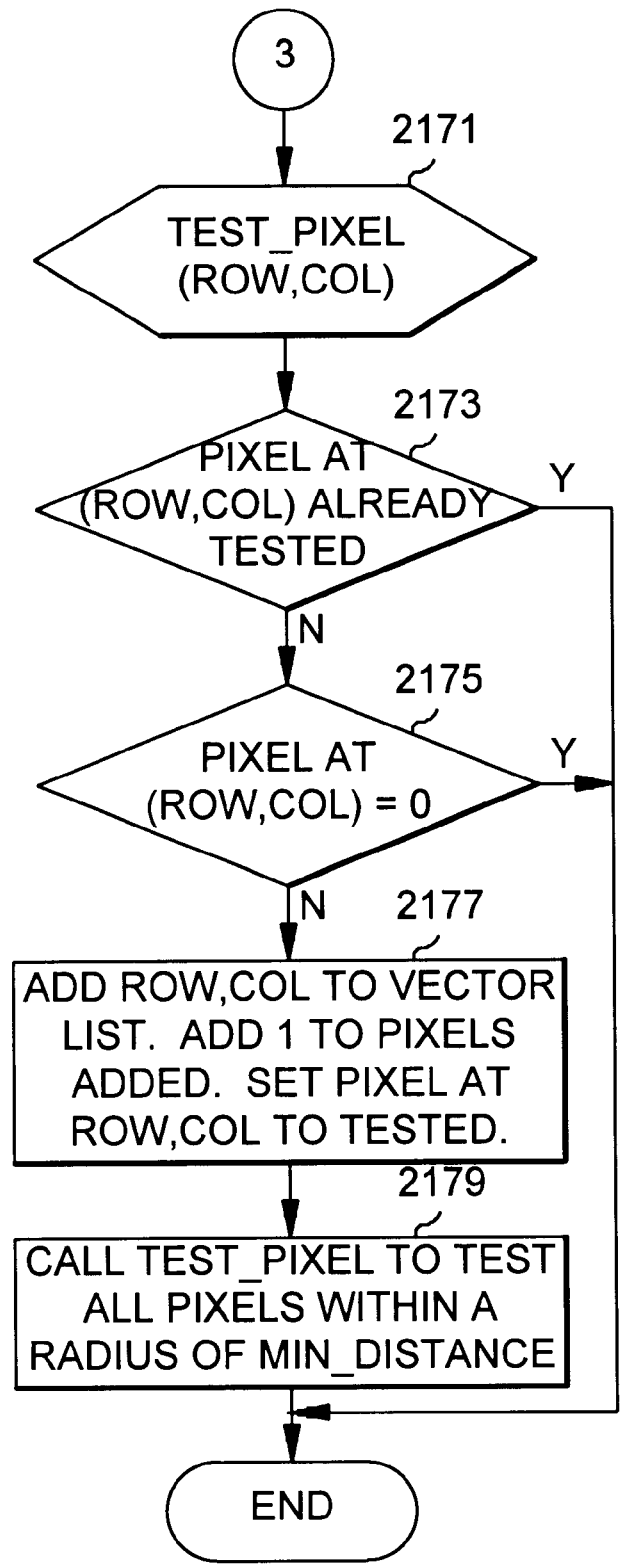

FIGS. 21*a*–21*c* show the steps typically used for the raster to vector conversion process. At 2101 the system checks to see if the fingerprint scanner is ready. If not, control stays at 2101 until the scanner is ready. If so, control moves to 2103 where the image is read and the number of buffers used is set to 1. At 2105, the pixels previously read into buffer 1 are averaged, and the result is placed in buffer 2. At 2107, the system searches for edges with a kebnel function and copies those from buffer 1 into buffer 2. At 2109, the image buffer is scanned searching for a first edge corresponding to a fingerprint ridge or valley. Once an edge is found, start point A,B and end point C,D is determined for the line defined by the edge. At 2111, the lines defined by points A,B and C,D are used to generate table 1 which contains a list of all of the lines. At 2113, table 1 is used to compute the average low value, the average value, and the average high value for each of the pixels defined in each of the lines. At 2115, the current row is set equal to the Y origin minus a constant value, and at 2117 the threshold value is set to the previously determined average low value of step 2113. At 2119 the scan lines scan lines are processed, and at 2121 the difference of adjacent values is compared with that of the minimum value.

If the difference is not less than the minimum value, at 2123 the threshold value is incremented and compared to see if it is less than the average high value. If it is less than the average high value, control returns to 2119. Otherwise, at 2125 the row is incremented and compared to see if it is less than the Y origin point plus a constant value. If the incremented row value is less than the Y origin plus a constant, control returns to 2117. Otherwise, at 2127 the threshold value is set to the threshold value that produced the least difference, and at 2129 the process is repeated for the vertical scan direction.

If at 2121 the difference of adjacent values was not less than the minimum value, control moves to step 2131 where the buffer 3 image is scanned and the pixels are set based on the previously determined threshold value determined at 2117. At 2133, buffer 3 is scaled by a factor of 2:1 to produce buffer 4, which is a 256×246 image. At 2135, the row position is set to 0. At 2137, the column position is set to 0. At 2139, the pixel contained in buffer 4 at the current row and the column position is checked to see if it is equal to 0. If the pixel is set to 0, control moves ahead to step 2147. Otherwise, at 2141 the count value is set equal to the number of pixels within a radius determined by the minimum feature radius. At 2143, the pixel count is then checked to see if it is less than the minimum count. If not, control moves ahead to 2147. Otherwise, at 2145 the pixel contained in buffer 4 at the current row and column position is set equal to 0.

At 2147, the column value is incremented and checked to see if it is less than 246. If so, control returns to step 2139. Otherwise, at step 2149, the row value is incremented and checked to see if it is less than 512. If so, control returns to step 2137. Otherwise, at 2151 the vector number is set equal to 0, the row value is set equal to 0, the number of pixels added is equal to 0, and at step 2153, column is set equal to 0.

At step 2155, the pixel located at the current row and the column is tested to see if it should be added to the current list. At 2157, the number of pixels is then checked to see if it is not equal to 0. If not, control skips ahead to step 2163. Otherwise, at 2159 the number pixels added is set equal to 0 and the vector number is set equal to the vector number plus 1. At 2161, the image is scanned and each pixel that was added to the vector list is set equal to 0. At 2163, the column number is incremented, and at 2165 the column is then checked to see if it is less than 512. If so, control returns to step 2155. Otherwise, at step 2167 the row value is incremented, and at 2169 the row value is checked to see if it is less than 246. If so, control returns to step 2153. Otherwise, at 2171 the pixel located at the current row and column value is tested to see if it should be added to the vector list.

At 2173, the pixel at the current row and column location is checked to see if it has already been tested. If so, the process is complete and execution terminates. If not, at 2175 the pixel at the current row and column position is checked to see if it is equal to 0. If so, the process is finished and execution terminates. If not, at 2177 the current row and column pixel is added to the vector list, the number of pixels added is incremented by 1, and the pixel located at the current row and column position is set to be tested. Finally, at 2179 the procedure test$_{13}$pixel is called to test all pixels within a radius of the minimum distance of the current row and column position.

Image Processing

The initial scan may be level adjusted to convert 6-bit value pixels into ON/OFF values. The original pixels can have a value of 0 to 63 based on the 6-bit A/D conversion of the initial scan. This process typically includes the steps of doing a median pass on the first scan, followed by level averaging. The following steps may then be performed to process the image:

1) Median Pass. The master scan is preferably parsed top to bottom, left to right. The median pass typically consists of sorting the pixel values of a 3×3 block and selecting the center value from the sorted list and storing that value into a second display buffer (Master Clean #1). The median pass enhances ridges and valley areas associated with fingerprints.

2) Level Adjust Pass. All pixels in the Master Clean #1 buffer are typically added and the average value computed. The pixel values above this average value are added and an average high value is computed. This is followed by the computation of the average low pixel value.

The result is preferably three level average values, HIGH AV, MID AVG and LOW AVG. The difference between the high and low average values is called the "threshold range" or "noise margin". The noise margin typically represents the change in value a pixel must be in error by in order to be misinterpreted (e.g. on rather than off).

Ideally, if the scanning light source is at an optimum angle to the fingerprint being scanned, the width of fingerprint ridges tends to equal the width of the fingerprint valleys. This represents the best case scenario for conversion to two-value vector data (on/off, black/white). However, since people have varying geometries of ridge to valley according to skin-toughness, heredity, and pressure applied during the scan process, a self-regulating adaptive technique for normalizing ridge to valley 1:1 width ratios normally applied.

The adaptive technique may be applied during the level adjust pass by adjusting the threshold at which a pixel is turned on or off, such that a cross section of the scan produces the most even spacing of ridge to valley ratios. The cross section test is typically performed at the center of scan from left to right. This generally produces the best results for level adjust, however, if ratios close to 1:1 can not be achieved, then the cross section sample is adjusted up or down and the process is repeated. In the preferred embodiment, once the ideal threshold level is determined, the result of the median pass (Master Clean #1) is parsed and pixels are typically converted to on/off values according to this threshold, and the result is stored as Master Clean #2. Pixel values which fall on the threshold value are stored as 'on', or 'off' according to whether the surrounding pixel average value is greater or less than that of the threshold value.

3) Master Clean #2 is then usually filtered using a 'Low Pass Filter FN-C' transform. This pass filters out many of the features which do not meet the minimum feature rules. The minimum feature rule is sensitive to overall scan resolution and more effective results are obtained at higher scan resolutions. For example, a print with 30 significant ridges and valleys would have a pixel to feature ratio of approximately 8:1 in the best case, assuming an approximate 500×500 scan. Therefore, features significantly less than 8 pixels in size in the x and y dimension are typically filtered out. The FN-C transform weights may be adjusted to compensate for varying scan resolutions.

4) Master Clean #2 is typically scaled 2:1 for subsequent passes at a lower resolution. This results in a 256×256 pixel image.

5) Island removal. The bitmap array is preferably scanned from left to right, top to bottom to locate objects which do not meet the minimum feature rules and which are not associated with other significant features.

In the preferred embodiment, if a current pixel is part of a minimum feature element, which is adjustable according to the resolution of the scan but will be assumed to be four pixel elements for this discussion, or if the pixel is within the vicinity (2 pixel elements) of other 'on' pixels, then it is saved.

In summary, usually a pixel's neighbors are checked for an 'on' condition and the neighbors are checked for adjacency to other 'on' pixels until a count equal to the minimum count rule is obtained. If a minimum count is obtained, the pixel is saved. If a minimum count is not obtained, then the current pixel and its 'on' neighbors are checked for being in the vicinity of other significant features which meet the minimum rule requirement. Vicinity is typically a variable pixel count value which is sized for the best results for the given scan resolution.

The process described above is preferably time-optimized by updating an ordered array for each pixel and its neighbors which have been previously saved. As the scan is processed, the ordered array is checked to determine if the current pixel requires processing. If the current pixel is located in the ordered array, it is not typically reprocessed.

Subsequent passes typically prepare the data for raster to vector conversion.

6) Vector Parse #1. The ordered array from Step 5 is typically parsed from top to bottom, left to right, looking for pixels that are 'on'. When an 'on' pixel is located, an entry in the vector list may be created and that pixel address may be stored as belonging to the newly created vector entry. The vector list is preferably maintained utilizing a b-tree record structure in order to facilitate lookups as pixels are processed.

| B-Tree Vector List | B-Tree Pixel List |
|---|---|
| Vector #1 | Pixel Address #1 |
| Pixel Address 1 | Vector #1 |
| Pixel Address 2 | Vector #N |
| Pixel Address N | Pixel Address #2 |
| Vector #2 | Vector #1 |
| Pixel Address 1 | Vector #2 |
| Pixel Address 2 | |
| Pixel Address N | Pixel Address N |
| Vector #N | |

At the same time a first entry is created in the vector list file, an entry is usually made in the b-tree pixel list file. The pixel list file is typically used during vector processing to determine if a pixel has been assigned to a vector and what vector it has been assigned to.

As the scan array is examined, typically each 'on' pixel address is checked and looked for in the pixel list to determine if it is adjacent to a pixel which has already been assigned to a vector. If it is adjacent, then this pixel address is added to the vector list entry which contains one or more adjacent pixels. The new 'on' pixel address is then added to the Pixel List file.

If the new 'on' pixel address is found not to be adjacent to an existing entry in the pixel list, then a new vector entry is preferably added to the vector list and pixel list files. Adjacent pixel addresses are determined by the table given below. Where the current pixel=X, Y, adjacent pixels are given by:

| 0,0 | | |
|---|---|---|
| X-1, Y-1 | X, Y-1 | X+1, Y-1 |
| X-1, Y | X,Y | X+1, Y |
| X-1, Y+1 | X, Y+1 | X+1, Y+1 |

After the first vector parse pass, the vector list normally contains a record entry for each vector found, and each record points to a list of pixel addresses which make up that vector. In addition, the pixel list may consist of 'on' pixel records, each one of which points to the vector number which it belongs to.

7) Vector Parse #2. Vectors are typically thinned, angle categorized, and end points are assigned. The following criteria are usually examined:

1) Orientation of vectors.
2) Endpoints of vectors.

Pixels associated with each vector in the vector list are preferably sorted in a special manner called MINX, MINY adjacency order. This produces a pixel order which matches directional changes of the vector. The pixel list for each vector is typically sampled by an increment value (number of pixel length, a variable determined by scan resolution) to determine the segment direction and end points. As the vector list is parsed in this manner, a new vector list file is usually built consisting of vector number and a list of end point pairs. The end point pairs represent each actual vector as a group of directional line segments, similar to a "connect the dots" puzzle representation.

A special vector form is preferably used in the new vector list for pixel groupings which are not discernible as simple line segments. These vectors are typically represented as complex polygons by using the vertice points to mark the outline.

8) The vector list is usually further simplified by combining vectors whose end points fall within the proximity of other end points as determined by scan resolution and the proximity variable. This process typically requires several passes on each successive generated list until no more vectors are combined, thereby concluding the process. During the preferred vector joint process, complex polygon structures are converted to simple line segments according to a first proximity rule. The first vertice found to be proximate to another line segment end point is considered to be the starting point of a new line segment, and the general direction of the processing line segment is used to project the end point of the new line segment. If more than one vertice is found to have proximity, then an average point between them is normally picked. This holds for both end points of the newly formed line segments. In this manner, most complex polygons are converted to simple line vectors.

9) The vector list is usually scanned for isolated vectors which consist of single line segments or isolated complex polygons. These entries are typically deleted from the list and are considered to be scan noise.

10) Following minimization of the vector list, all vectors normally are classified according to vector type. Vectors are typically classified as belonging to the following categories:

1) Line=Rod
2) Loop
3) Double Loop
4) Wave=Arch, or tented Arch
5) Spiral
6) Oval or Circle
7) Partial arc
8) Bifurcation or Possible Delta The rules for line type classifications are previously described in the above discussion. During vector classification, several rules are typically utilized to differentiate between vector types:

a) If a vector sufficiently recurves back on itself, then this line type is initially classified as a loop until further processing determines that it is an oval, circle, or a double loop. An oval or circle classification means the vector rejoins itself in a circular pattern and is isolated, does not exit the scan window, and does not join other features. A double loop vector doubles back on itself and exits scan window. Loops recurve a minimum of 180°, ovals and circles recurve a minimum of 360° and can be retraced without ending. If a loop continues to recurve for more than 360° and does not intersect previous recurves, then the vector is classified as a spiral.

b) Isolated simple vectors are classified as straight lines if there is less than a 5° deviation in direction of the vector.

c) Vectors which flow left to right and recurve less than 45° but more than 5° are classified as plain arch vectors.

d) Vectors which flow left to right and recurve more than 45° are classified as tented arch vectors.

e) Isolated simple vectors are classified as arcs if there is more than a 5° deviation in vector direction and the vector does not recurve on itself.

The remaining vectors are classified as complex and are tagged for possible breakdown into simpler components or possible categorization as a bifurcation vector which may subsequently become a delta origin.

11) Following the first vector classification pass, another vector minimization pass is executed which combines straight lines, arcs, and arches into more complete possible vectors.

The end points of each line type are checked for proximity to end points of other line types as follows:

1) Straight lines to straight lines.
2) Straight lines to arcs.
3) Straight lines to arches.
4) Arcs to arcs.
5) Arcs to arches.

In each case, the end segments of the line type are checked for projected flow to determine if a possible link should exist or if a link can exist which would not violate another vector (i.e. would not cross the vector) and would logically build a more complex vector.

Isolated straight lines and arcs will therefore tend to complete new arches or arcs, arcs and arches will tend to build more complete arches, and arcs will combine to form new loops and arches.

Following this vector minimization, the scanned print is more completely and accurately classified.

12) The next pass usually involves the breakdown of complex vectors into possible simple vector types. Vectors which were categorized as complex are now parsed for possible segmentation into loops, line, arc, arches and bifurcations. Common examples of these patterns would be loops that intersect, or lines (rods) which intersect loops, and triangle based patterns which actually form bifurcations. For classification purposes, bifurcation coordinates are saved and any hanging vector which forms part of the bifurcation is typically checked against all other remaining lines, arcs, arches and loop end points for proximity. As described above, if a logical relationship exists, then a new more complete vector is typically formed which ends at the bifurcation coordinate. If no relationship exists, then the hanging vector is typically recategorized as an independent line or arc vector.

Following segmentation and vector reclassification, all vectors which have not been classified are now classified as 'unknown'. Unknown vectors are generally made up of scan irregularities due to scarring, cuts, and other anomalies.

13) The fingerprint may now be classified according to FIS rules.

First, the vector types are tabulated. For classification typing the location relationship of vector types to each other should be known. The following factors are of interest:

1) For loop vectors, which one is the innermost loop.
2) For double loop vectors, which one is the innermost loop.
3) For circle vectors, which one is the innermost circle.
4) For spiral vectors, which one is the innermost spiral.

These relationships are easy to determine since the vector type list consists of coordinate points for each vector. Following the determination of these features, further processing is typically performed as follows:

1) If loops, double loops, circles or spiral vectors were detected, then which line vectors are enclosed by the center most loop, double loop, circle or spiral present are determined. These line vectors are used later to determine the core location.

2) If loops, double loops, circles or spiral vectors were detected then:

Moving out from this central most Vector, the outermost loop, double loop, circle or spiral vector is located which encompasses the central most vector. This is used later to help determine print rotation and isolation of 'Line Types', which are the border of the pattern area of interest.

After locating the outermost loop, a double loop, circle or spiral vector, an arch (wave pattern) vector or list of vectors which are closest to and yet still enclose the outermost vector found in the previous step are located. This list of vectors flows from left to right and meet FIS rules for 'Line Type Border' classification. There are typically two sets of vectors which make up the 'Line Type Borders', one for the upper boundary and one for the lower boundary (see FIS writeup).

If no loops, double loops, spiral or circle vectors are located, then the fingerprint is normally classified and processed according to plain or tented arch rules.

After locating all vectors of interest for classification purposes, the print is typically then normalized and rotated according to FIS rules. If the print contains loops or double loops in the central region, then it is processed as a loop pattern. If it contains circles or spirals it is processed as a whorl pattern.

The vector list is normally rotated such that the geometric mean of vectors of interest are at 90° to the x plane of the scan. This provides a consistent basis for FIS processing regardless of gross angle deviation which can occur in multiple scans of the same print. In this manner, the print is normalized to a standard coordinate system. For loops, double loops, circles and spirals, the geometric mean is computed for each of these Vectors from the innermost to the outermost within the pattern area, and they are averaged to determine the overall geometric mean for rotation purposes.

14) Following classification and rotation of the vector list, the print may be processed for ID number encryption. Deltas and cores are located if appropriate, according to FIS rules. All bifurcation coordinates and unknown vector type locations are parsed for meeting the delta FIS rules.

If the print was classified as an arch (wave) pattern, then the base wave is located as described above in the FIS rules, and the ID number is generated using those rules.

Non-Arch Classifications

In determining ID number generation, all vectors which fall out of the pattern area as defined by the line types are usually discarded. The remaining vectors are typically drawn into a 256×246 raster bitmap. The ID number is then computed by super-imposing vectors and computing individual components as described in the examples given above.

Image Processing Functions

The following routine for counting ridges produces a table which contains counts of adjacent pixels on, then off, then on.

Line_Scan_Square_Wave (row, threshold)
clear count table to zero index=0
if Image_buf[row][a]<threshold
 then Test_value=0
 else Test_value=1
for col=(a+1) to (c−1) do
 if Image_buf[row][col]<threshold then Value=0
else Value=1
if Test_value<>Value
then add 1 to Index
add 1 to Count_table[Index]
Test_value=Value
end do Vector Cleaning The vector list may contain false end points. As an example, for the partial expanded vector shown in FIG. 23, the pixel marked X would appear as on an end point when it is in fact not. Therefore, the vector list is scanned for all possible end points. Those which are not end points are not removed, but rather marked as not end points.

Add-to-vector-list Structure

This function uses the structure defined below to save all x,y coordinates of a row vector.

| struct Vector_list | |
| --- | --- |
| byte | y_min |
| byte | y_min |
| byte | y |
| struct Vector_list pointer | parent |
| struct Vector_list pointer | y_less_than |
| struct Vector_list pointer | y_greater_than |
| end struct | |

A vector such as shown in FIG. 24 would produce an ordered tree as shown in FIG. 25. The end points are defined as:

1) Parent (P)=0 and X less_than_pointer (LT) =0. (e.g. point A)
2) LT=0 and GT=0. (e.g. points E and F)

Possible bifurcation is defined by LT<>0, and GT <>0. (e.g. point C)

Vector Thinning

Vector thinning reduces line segments which are several pixels wide to a single line defined by line end points. The procedure locates an end point, finds the average x or y, then locates the end of the segment a minimum or maximum number of pixels away, as shown in FIG. 26. In this case, the starting and ending coordinates are defined as follows:

$$\text{start } x = (x + x)/2 = x$$

$$\text{start } y = (y + (y + 2))/2 = y + 1$$

$$\text{end } x = ((x + 6) + (x + 6))/2 = x + 6$$

$$\text{end } y = ((y) + (y - 2))/2 = y - 1$$

The line segment is represented by the ordered pairs (x, y+1) and (x+6, y−1). The point (x+6, y−1) then becomes the start point for the next segment. This process is repeated until an end point is reached. The vector list is then scanned for any other end points not processed, and the process is repeated. As this point, the vector list comprises a list of line segments that closely represents the original multi-pixel segment.

Vector List Combine

Because line segments forming the same line may be adjacent but not overlapping, line segments or end points which are within some minimum distance are located and combined by the following steps:

1) Draw all line segments.
2) At each line endpoint, test the surrounding points within the minimum feature length to see if any pixels are set. If there are, create a new segment and combine the two segment list into one.

The present invention is to be limited only in accordance with the scope of the appended claims, since others skilled in the art may devise other embodiments still within the limits of the claims.

What is claimed is:

1. A method of converting an image-enhanced digitized raster fingerprint image having raster image pixels to vector line types in order to generate a unique identification number for the fingerprint, comprising the steps of:

(a) electronically converting the raster image pixels to a plurality of vectorized lines, each vectorized ridge line comprising a plurality of vector line segments along the fingerprint ridges;

(b) electronically classifying each of the vectorized ridge lines as belonging to one of a plurality of vectorized ridge line types;

(c) analyzing the vectorized ridge lines and generating a list of identification features corresponding to each of the particular vectorized ridge lines;

(d) classifying the image as belonging to one of a plurality of fingerprint classes by comparing the identification features corresponding to the vectorized ridge lines; and (e) using the classified image to generate a fingerprint identification code by numerically encoding the identification features and line types corresponding to the vectorized ridge lines of the image, wherein the plurality of vectorized ridge line types includes line, loop, double loop, wave, spiral, oval, partial arc, and bifurcation types.

2. The method of claim 1 wherein the plurality of fingerprint classes includes plain arch, tented arch, radial loop, ulnar loop, accidental whorl, central pocket loop whorl, double loop whorl, and plain whorl.

3. A method of converting an image-enhanced digitized raster fingerprint image to vector line types in order to generate a unique identification number for the fingerprint, comprising the steps of:

(a) electronically defining vectorized ridge lines, each vectorized ridge line comprising a plurality of vector line segments along the fingerprint ridges, the vectorized ridge lines corresponding to a plurality of vectorized ridge line types within the fingerprint;

(b) classifying the fingerprint by class according to the line types;

(c) electronically locating the coordinates of a core point, delta point, and origin point of the fingerprint;

(d) electronically determining a geometric mean line of the fingerprint according to the vectorized ridge lines of the fingerprint classification and calibrating the vectorized ridge lines to a fixed coordinate system in order to reassign an origin;

(e) determining identification features of the fingerprint from the core point, delta point, and origin point; and (f) generating a fingerprint identification code by numerically encoding the identification features and line types of the fingerprint.

4. The method of claim 3 wherein the plurality of vectorized ridge line types includes line, loop, double loop, wave, spiral, oval, partial arc, and bifurcation types.

5. The method of claim 3 wherein the plurality of fingerprint classes includes plain arch, tented arch, radial loop, ulnar loop, accidental whorl, central pocket loop whorl, double loop whorl, and plain whorl.

6. The method of claim 3 further comprising the steps of:
(a) projecting a first vector from the core point parallel to the geometric mean line of the fingerprint image;
(b) projecting a second vector from the delta point to a point intersecting with the first vector;
(c) defining a third vector connecting the core point and the delta point; and
(d) determining a first ridge count along the first vector, a second ridge count along the second vector, and a third ridge count long the third vector;
wherein the first, second, and third ridge counts comprise identification features of the image used to generate the fingerprint identification code.

7. The method of claim 6 wherein the identification features of the fingerprint include the number of ridge crossings of the first, second, and third vectors, the length and angle of the core coordinate vector, the delta coordinate, and the fingerprint classification.

8. The method of claim 6 wherein the triangle comprises a right triangle wherein the second vector intersects with the first vector at a substantially right angle.

9. The method of claim 3 wherein the step of calibrating the vectorized ridge lines comprises the step of normalizing features of the fingerprint image to a fixed coordinate system having a x-axis and a y-axis.

10. The method of claim 9 further comprising the steps of:
(a) determining a geometric mean for each of the plurality of vectorized ridge lines within the fingerprint image and averaging the geometric mean for each of the plurality of vectorized ridge lines to determine a geometric mean line of the fingerprint image;
(b) projecting a first vector from the core point to a point parallel to the geometric mean line of the fingerprint image;
(c) projecting a second vector from the delta point to a point intersecting with the first vector, the intersection point forming an origin;
(d) defining a third vector connecting the core point and the delta point;
(e) rotating the fingerprint image around the origin point until the second vector is parallel with the x-axis and the first vector is parallel with the y-axis; and
(f) determining a first ridge count along the first vector, a second ridge count along the second vector, and a third ridge count long the third vector;
wherein the first, second, and third ridge counts comprise identification features of the image used to generate the fingerprint identification code.

11. The method of claim 9 wherein the features of the fingerprint image include minutiae points, bifurcation points, and complex vectors.

12. A method for verifying that a sample image of a fingerprint is that of a designated person, the sample image being an image-enhanced digitized raster image having raster image pixels, the method comprising the steps of:
(a) electronically converting the raster image pixels to a plurality of vectorized ridge lines, each vectorized ridge line comprising a plurality of vector line segments along the fingerprint ridges;
(b) electronically classifying each of the vectorized ridge lines as belonging to one of a plurality of vector line types;
(c) electronically identifying each of the vector lines corresponding to its classified line type and identifying each of the vector lines as belonging to a particular vectorized ridge line;
(d) analyzing the vectorized ridge lines and generating a list of identification features corresponding to the vectorized ridge lines;
(e) classifying the image as belonging to one of a plurality of fingerprint classes by comparing the identification features corresponding to the vector line types;
(f) using the classified image to generate a fingerprint identification code by numerically encoding the identification features and line types corresponding to the vectorized ridge lines of the image; and
(g) comparing the fingerprint identification code of the sample image with that of the fingerprint identification code of the designated person, wherein the plurality of vector line types includes line, loop, double loop, wave, spiral, oval, partial arc, and bifurcation types.

13. The method of claim 12 wherein the plurality of fingerprint classes includes plain arch, tented arch, radial loop, ulnar loop, accidental whorl, central pocket loop whorl, double loop whorl, and plain whorl.

14. A method of classifying an image-enhanced rasterized fingerprint image according to fingerprint class comprising the steps of:
(a) electronically converting pixels of the rasterized fingerprint image to a plurality of vectorized ridge lines, each vectorized ridge line comprising a plurality of vector line segments along the fingerprint ridges;
(b) electronically classifying each of the vectorized ridge lines as belonging to one of a plurality of vectorized ridge line types;
(c) analyzing the vectorized ridge lines and generating a list of corresponding identification features; and
(d) classifying the image as belonging to one of a plurality of fingerprint classes by comparing the identification features and line types corresponding to the vectorized ridge lines, wherein the plurality of vectorized ridge line types includes line, loop, double loop, wave, spiral, oval, partial arc, and bifurcation types.

15. The method of claim 14 further comprising the step of using the classified image to generate a fingerprint identification code by numerically encoding the identification features and line types of the image.

16. The method of claim 15 further comprising the step of comparing the fingerprint identification code of the sample image with that of the fingerprint identification code of the designated person.

17. The method of claim 14 wherein the plurality of fingerprint classes includes plain arch, tented arch, radial loop, ulnar loop, accidental whorl, central pocket loop whorl, double loop whorl, and plain whorl.

18. The method of claim 14 wherein the identification features of the fingerprint include the number of ridge crossings of a first, second, and third vector, a length and angle of a core coordinate vector, a delta point coordinate, and the fingerprint classification.

19. A method of normalizing the features of an image-enhanced digitized raster fingerprint image to a fixed coordinate system having a x-axis and a y-axis, the method comprising the steps of:
(a) electronically locating the coordinates of a core point and a delta point of the fingerprint;
(b) projecting a first vector from the core point parallel to the geometric mean line of the fingerprint image;
(c) projecting a second vector from the delta point to a point intersecting with the first vector, thereby forming an origin; and
(d) rotating the image around the origin until the second vector is parallel with the x-axis and the first vector is parallel with the y-axis.

20. The method of claim 19 wherein the features of the fingerprint image include minutiae points, bifurcation points, and complex vectors.

21. A method of converting an image-enhanced digitized raster fingerprint image having raster image pixels to vector line types in order to generate a unique identification number for the fingerprint, comprising the steps of:

(a) electronically converting the raster image pixels to a plurality of vectorized lines, each vectorized ridge line comprising a plurality of vector line segments along the fingerprint ridges;

(b) electronically classifying each of the vectorized ridge lines as belonging to one of a plurality of vectorized ridge line types;

(c) analyzing the vectorized ridge lines and generating a list of identification features corresponding to each of the particular vectorized ridge lines;

(d) classifying the image as belonging to one of a plurality of fingerprint classes by comparing the identification features corresponding to the vectorized ridge lines; and (e) using the classified image to generate a fingerprint identification code by numerically encoding the identification features and line types corresponding to the vectorized ridge lines of the image;

(f) determining a geometric mean for each of the plurality of vectorized ridge lines within the fingerprint image and averaging the geometric mean for each of the plurality of vectorized ridge lines to determine a geometric mean line of the fingerprint image;

(g) projecting a first vector from a core point parallel to the geometric mean line of the fingerprint image;

(h) projecting a second vector from a delta point to a point intersecting with the first vector;

(i) defining a third vector connecting the core point and the delta point; and (j) determining a first ridge count along the first vector, a second ridge count along the second vector, and a third ridge count long the third vector;

wherein the first, second, and third ridge counts comprise identification features of the image used to generate the fingerprint identification code.

22. The method of claim 21 wherein the identification features of the fingerprint include the number of ridge crossings of the first, second, and third vectors, the length and angle of a core coordinator vector, the delta point coordinate, and the fingerprint classification.

23. The method of claim 21 wherein the second vector intersects with the first vector at a substantially right angle.

24. The method of claim 21 wherein the step of numerically encoding the identification features of the fingerprint image further comprises the step of concatenating at least two features selected from the group consisting of a delta point coordinate value, core point coordinate value, ridge count values for the first, second, and third vectors, and an image classification value into the unique identification number.

25. The method of claim 24 wherein the delta point coordinate value and the core point coordinate value each comprise an 11-bit signed number ranging from −999 to +999.

26. The method of claim 24 wherein ridge count values for the first, second, and third vectors each comprise a 6-bit integer number ranging from 0 to 63.

27. The method of claim 24 wherein the image classification value comprises a 2-bit integer number where a value of 0 represents a loop, 1 represents a whorl, and 2 represents an arch.

28. The method of claim 24 wherein the step of numerically encoding the identification features of the fingerprint image further comprises the step of concatenating a list of a plurality of vector lines for at least a portion of the vectorized ridge lines with the unique identification value.

29. A method for verifying that a sample image of a fingerprint is that of a designated person, the sample image being an image-enhanced digitized raster image having raster image pixels, the method comprising the steps of:

(a) electronically converting the raster image pixels to a plurality of vectorized ridge lines, each vectorized ridge line comprising a plurality of vector line segments along the fingerprint ridges;

(b) electronically classifying each of the vectorized ridge lines as belonging to one of a plurality of vector line types;

(c) electronically identifying each of the vector lines corresponding to its classified line type and identifying each of the vector lines as belonging to a particular vectorized ridge line;

(d) analyzing the vectorized ridge lines and generating a list of identification features corresponding to the vectorized ridge lines;

(e) classifying the image as belonging to one of a plurality of fingerprint classes by comparing the identification features corresponding to the vectorized ridge lines;

(f) using the classified image to generate a fingerprint identification code by numerically encoding the identification features and line types corresponding to the vectorized ridge lines of the image;

(g) comparing the fingerprint identification code of the sample image with that of the fingerprint identification code of the designated person;

(i) determining a geometric mean for each of the plurality of vectorized ridge lines within the fingerprint image and averaging the geometric mean for each of the plurality of vectorized ridge lines to determine a geometric mean line of the fingerprint image;

(j) projecting a first vector from a core point to a point parallel to the geometric mean line of the fingerprint image;

(k) projecting a second vector from a delta point to a point intersecting with the first vector at a substantially right angle;

(l) defining a third vector connecting the core point and the delta point; and (m) determining a first ridge count along the first vector, a second ridge count along the second vector, and a third ridge count long the third vector;

wherein the first, second, and third ridge counts comprise identification features of the image used to generate the fingerprint identification code.

30. The method of claim 29 wherein the plurality of vectorized ridge line types includes line, loop, double loop, wave, spiral, oval, partial arc, and bifurcation types.

31. The method of claim 30 wherein the plurality of fingerprint classes includes plain arch, tented arch, radial loop, ulnar loop, accidental whorl, central pocket loop whorl, double loop whorl, and plain whorl.

32. The method of claim 29 wherein the identification features of the fingerprint include the number of ridge crossings of the first, second, and third vectors, the length and angle of a core coordinate vector, the delta point coordinate, and the fingerprint classification.

33. The method of claim 29 wherein the triangle comprises a substantially right triangle.

* * * * *